United States Patent
Okada et al.

(10) Patent No.: US 11,754,678 B2
(45) Date of Patent: Sep. 12, 2023

(54) ELECTROMAGNETIC WAVE DETECTION APPARATUS, PROGRAM, AND ELECTROMAGNETIC WAVE DETECTION SYSTEM

(71) Applicant: KYOCERA Corporation, Kyoto (JP)

(72) Inventors: Hiroki Okada, Machida (JP); Eri Uchida, Yokohama (JP); Hiroyuki Minagawa, Yokohama (JP); Yoshiteru Takayama, Susono (JP); Mitsuo Ono, Mitaka (JP); Atsushi Hasebe, Yokohama (JP); Katsutoshi Kawai, Ichinomiya (JP); Yukitoshi Kanayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 808 days.

(21) Appl. No.: 16/494,622

(22) PCT Filed: Mar. 1, 2018

(86) PCT No.: PCT/JP2018/007893
§ 371 (c)(1),
(2) Date: Sep. 16, 2019

(87) PCT Pub. No.: WO2018/168507
PCT Pub. Date: Sep. 20, 2018

(65) Prior Publication Data
US 2020/0018858 A1 Jan. 16, 2020

(30) Foreign Application Priority Data
Mar. 17, 2017 (JP) .................. 2017-053552

(51) Int. Cl.
*G01S 7/481* (2006.01)
*G01S 7/497* (2006.01)
*G01S 17/894* (2020.01)

(52) U.S. Cl.
CPC .............. *G01S 7/481* (2013.01); *G01S 7/497* (2013.01); *G01S 17/894* (2020.01)

(58) Field of Classification Search
CPC ......... G01S 7/481; G01S 17/894; G01S 7/497
(Continued)

(56) References Cited

U.S. PATENT DOCUMENTS 9,689,667 B2 6/2017 Royo Royo et al.
2007/0216769 A1 9/2007 Zganec et al.
(Continued)

FOREIGN PATENT DOCUMENTS

EP 2 957 926 A1 12/2015
JP 2004-163271 A 6/2004
(Continued)

OTHER PUBLICATIONS

JP2009115777 Machine Translation (Year: 2009).*

*Primary Examiner* — Nguyen T Truong
(74) *Attorney, Agent, or Firm* — Studebaker & Brackett PC

(57) ABSTRACT

An electromagnetic wave detection apparatus (10) includes an irradiator (11), a first detector (17), a memory (13), and a controller (14). The irradiator (11) irradiates electromagnetic waves. The first detector (17) includes detection elements. The detection elements detect, by irradiation position, reflected waves of the electromagnetic waves irradiated onto an object (ob). The memory (13) stores related information. The related information is information associating any two of the emission direction of the electromagnetic waves and elements defining two points on a path. The path refers to a path of the electromagnetic waves emitted from the irradiator (11) to the first detector (17) via the object (ob). The controller (14) updates the related information based on the emission direction of the electromagnetic waves and the (Continued)

position of the detection element, among the detection elements, that detects the reflected waves of the electromagnetic waves.

11 Claims, 17 Drawing Sheets

(58) Field of Classification Search
USPC .......................................................... 356/4.01
See application file for complete search history.

(56) References Cited

U.S. PATENT DOCUMENTS

| | | | |
|---|---|---|---|
| 2011/0013172 A1* | 1/2011 | Takahashi | G01S 17/931 |
| | | | 356/4.01 |
| 2014/0049783 A1 | 2/2014 | Royo Royo et al. | |

FOREIGN PATENT DOCUMENTS

| | | | | |
|---|---|---|---|---|
| JP | 2009115777 | * | 5/2009 | ............ G01B 11/00 |
| JP | 2011-220732 A | | 11/2011 | |
| JP | 2012-58158 A | | 3/2012 | |
| JP | 2014-512525 A | | 5/2014 | |

* cited by examiner

FIG. 4

First related information

| Emission direction | Position of detection element |
|---|---|
| $(\theta_0, \phi_0)$ | $(x_0, y_0)$ |
| $(\theta_0, \phi_1)$ | $(x_0, y_1)$ |
| $(\theta_1, \phi_1)$ | $(x_1, y_1)$ |
| $(\theta_1, \phi_2)$ | $(x_1, y_2)$ |
| ⋮ | ⋮ |

FIG. 5

Second related information

| Emission direction | Irradiation position |
|---|---|
| $(\theta_0, \phi_0)$ | $(x''_0, y''_0)$ |
| $(\theta_0, \phi_1)$ | $(x''_0, y''_1)$ |
| $(\theta_1, \phi_1)$ | $(x''_1, y''_1)$ |
| $(\theta_1, \phi_2)$ | $(x''_1, y''_2)$ |
| ⋮ | ⋮ |

FIG. 6

Third related information

| Irradiation position | Position of detection element |
|---|---|
| $(x''_0, y''_0)$ | $(x_0, y_0)$ |
| $(x''_0, y''_1)$ | $(x_0, y_1)$ |
| $(x''_1, y''_1)$ | $(x_1, y_1)$ |
| $(x''_1, y''_2)$ | $(x_1, y_2)$ |
| ⋮ | ⋮ |

FIG. 7

Fourth related information

| Position of pixel | Position of detection element |
|---|---|
| $(x'_0, y'_0)$ | $(x_0, y_0)$ |
| $(x'_0, y'_1)$ | $(x_0, y_1)$ |
| $(x'_1, y'_1)$ | $(x_1, y_1)$ |
| $(x'_1, y'_2)$ | $(x_1, y_2)$ |
| ⋮ | ⋮ |

FIG. 8

Fifth related information

| Emission direction | Position of pixel |
|---|---|
| $(\theta_0, \phi_0)$ | $(x'_0, y'_0)$ |
| $(\theta_0, \phi_1)$ | $(x'_0, y'_1)$ |
| $(\theta_1, \phi_1)$ | $(x'_1, y'_1)$ |
| $(\theta_1, \phi_2)$ | $(x'_1, y'_2)$ |
| ⋮ | ⋮ |

FIG. 9

Sixth related information

| Irradiation position | Position of pixel |
|---|---|
| $(x''_0, y''_0)$ | $(x'_0, y'_0)$ |
| $(x''_0, y''_1)$ | $(x'_0, y'_1)$ |
| $(x''_1, y''_1)$ | $(x'_1, y'_1)$ |
| $(x''_1, y''_2)$ | $(x'_1, y'_2)$ |
| ⋮ | ⋮ |

FIG. 10

Seventh related information

| Signal value of drive signal | Emission direction |
|---|---|
| 000········000 | $(\theta_0, \phi_0)$ |
| 000········001 | $(\theta_0, \phi_1)$ |
| 000········010 | $(\theta_1, \phi_1)$ |
| 000········011 | $(\theta_1, \phi_2)$ |
| ⋮ | ⋮ |

ELECTROMAGNETIC WAVE DETECTION APPARATUS, PROGRAM, AND ELECTROMAGNETIC WAVE DETECTION SYSTEM

CROSS-REFERENCE TO RELATED APPLICATION

The present application claims priority to and the benefit of Japanese Patent Application No. 2017-053552 filed Mar. 17, 2017, the entire contents of which are incorporated herein by reference.

TECHNICAL FIELD

The present disclosure relates to an electromagnetic wave detection apparatus, a program, and an electromagnetic wave detection system.

BACKGROUND

In recent years, apparatuses have been developed to acquire information related to the surroundings from the results of detecting reflected waves of emitted electromagnetic waves. For example, an apparatus that uses laser radar to measure the position of an object is known, as in patent literature (PTL) 1.

CITATION LIST

Patent Literature

PTL 1: JP2011-220732A

SUMMARY

An electromagnetic wave detection apparatus according to a first aspect includes:

an irradiator configured to emit electromagnetic waves;

a first detector comprising a plurality of detection elements configured to detect, by irradiation position, reflected waves of the electromagnetic waves irradiated onto an object;

a memory configured to store related information associating any two of an emission direction of the electromagnetic waves and elements defining two points on a path of the electromagnetic waves emitted from the irradiator to the first detector via the object; and a controller configured to update the related information based on the emission direction of the electromagnetic waves and a position of a detection element, among the plurality of detection elements, that detects the reflected waves of the electromagnetic waves.

An electromagnetic wave detection system according to a second aspect includes:

an irradiator configured to emit electromagnetic waves;

a first detector comprising a plurality of detection elements configured to detect, by irradiation position, reflected waves of the electromagnetic waves irradiated onto an object;

a memory configured to store related information associating any two of an emission direction of the electromagnetic waves and elements defining two points on a path of the electromagnetic waves emitted from the irradiator to the first detector via the object; and a controller configured to update the related information based on the emission direction of the electromagnetic waves and a position of a detection element, among the plurality of detection elements, that detects the reflected waves of the electromagnetic waves.

A program according to a third aspect is for causing an apparatus to execute steps including:

emitting electromagnetic waves;

using a plurality of detection elements to detect, by irradiation position, reflected waves of the electromagnetic waves irradiated onto an object; and updating related information, the related information associating any two of an emission direction of the electromagnetic waves and elements defining two points on a path of electromagnetic waves to any detection element among the plurality of detection elements via the object, based on the emission direction of the electromagnetic waves and a position of a detection element, among the plurality of detection elements, that detects the reflected waves of the electromagnetic waves.

BRIEF DESCRIPTION OF THE DRAWINGS

In the accompanying drawings:

FIG. 4 illustrates an example of first related information stored in the memory of FIG. 1;

FIG. 5 illustrates an example of second related information stored in the memory of FIG. 1;

FIG. 6 illustrates an example of third related information stored in the memory of FIG. 1;

FIG. 7 illustrates an example of fourth related information stored in the memory of FIG. 1;

FIG. 8 illustrates an example of fifth related information stored in the memory of FIG. 1;

FIG. 9 illustrates an example of sixth related information stored in the memory of FIG. 1;

FIG. 10 illustrates an example of seventh related information stored in the memory of FIG. 1;

DETAILED DESCRIPTION

Embodiments of an electromagnetic wave detection apparatus to which the present disclosure is applied are described below with reference to the drawings. The correspondence relationship between any two of the emission direction of emitted electromagnetic waves and elements defining two points on a path from an emission source that emits the electromagnetic waves to a detector that detects reflected waves reflected by an object irradiated by the electromagnetic waves is estimated from previously obtained information. The estimated correspondence relationship may, however, differ from the actual correspondence relationship. Therefore, an electromagnetic wave detection apparatus to which the present disclosure is applied is configured to allow a reduction in the difference between the actual correspondence relationship and the estimated correspondence relationship.

Figure 1:
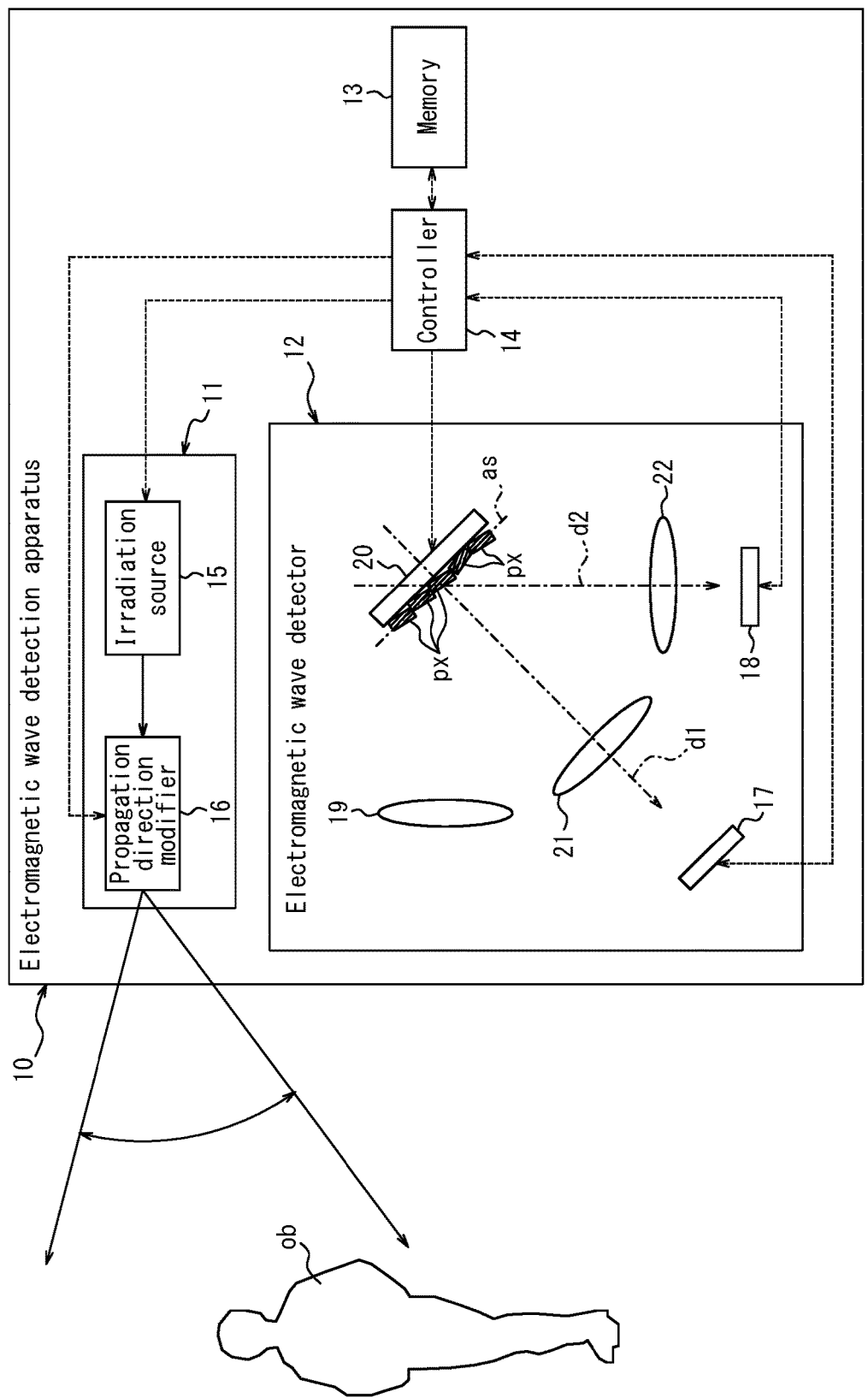
FIG. 1 is a configuration diagram schematically illustrating an electromagnetic wave detection apparatus according to an embodiment.

As illustrated in FIG. 1, an electromagnetic wave detection apparatus 10 according to an embodiment of the present disclosure includes an irradiator 11, an electromagnetic wave detector 12, a memory 13, and a controller 14.

In the drawings described below, the dashed lines connecting functional blocks indicate the flow of control signals or communicated information. The communication represented by the dashed lines may be wired communication or wireless communication. The solid lines projecting from each functional block indicate beams of electromagnetic waves.

The irradiator 11 includes an irradiation source 15 that emits at least electromagnetic waves. The irradiation source 15 emits electromagnetic waves that, for example, are at least one of infrared rays, visible light rays, ultraviolet rays, and radio waves. In the present embodiment, the irradiation source 15 emits infrared rays.

The irradiation source 15 irradiates electromagnetic waves in a beam with a predetermined width. In the present embodiment, the irradiation source 15 emits a narrow beam, for example 0.5°, of electromagnetic waves. The irradiation source 15 can emit electromagnetic waves in pulses or continuously. In the present embodiment, the irradiation source 15 emits pulses of electromagnetic waves. For example, the irradiation source 15 includes a light emitting diode (LED), laser diode (LD), or the like. The irradiation source 15 switches between emitting and not emitting electromagnetic waves in response to control by the controller 14, described below.

In the irradiator 11, the emission direction of the electromagnetic waves may be fixed or may be variable in response to control by the controller 14. In the present embodiment, the emission direction of electromagnetic waves is variable.

The emission direction of electromagnetic waves may be changed by causing electromagnetic waves emitted from a single irradiation source 15 to be reflected by a reflecting surface with a variable inclination angle. The emission direction of electromagnetic waves may be changed as in phased array radar, for example, by emission of electromagnetic waves from a plurality of irradiation sources 15, disposed in an array on a flat surface, while the phase is shifted little by little. In the present embodiment, the emission direction of the electromagnetic waves is changed by reflection using a reflecting surface, as described below.

As described above, the irradiator 11 in the present embodiment further includes a propagation direction modifier 16. The propagation direction modifier 16 includes a reflecting surface capable of changing orientation. The propagation direction modifier 16 changes the orientation of the reflecting surface based on a drive signal outputted by the controller 14, described below.

In accordance with the drive signal, the reflecting surface changes the propagation direction of the electromagnetic waves emitted from the irradiation source 15, thereby irradiating an object ob while changing the irradiation position. In other words, the propagation direction modifier 16 scans the object ob with the electromagnetic waves emitted from the irradiation source 15. The propagation direction modifier 16 scans the object ob in one or two dimensions. In the present embodiment, the propagation direction modifier 16 scans the object ob in two dimensions.

The propagation direction modifier 16 is configured so that at least a portion of an irradiation region of the electromagnetic waves that are emitted by the irradiation source 15 and reflected is included in an electromagnetic wave detection range of the electromagnetic wave detection apparatus 10. Accordingly, at least a portion of the electromagnetic waves irradiated onto the object ob via the propagation direction modifier 16 can be detected by the electromagnetic wave detection apparatus 10.

In the present embodiment, the propagation direction modifier 16 is configured so that at least a portion of the irradiation region of the electromagnetic waves that are emitted by the irradiation source 15 and reflected by the propagation direction modifier 16 is included in the detection range of a first detector 17 and a second detector 18. Accordingly, at least a portion of the electromagnetic waves irradiated onto the object ob via the propagation direction modifier 16 can be detected by the first detector 17 and the second detector 18.

The propagation direction modifier 16 may, for example, include a micro electro mechanical systems (MEMS) mirror, a polygon mirror, a galvano mirror, or the like. In the present embodiment, the propagation direction modifier 16 includes a MEMS mirror.

The electromagnetic wave detector 12 includes a pre-stage optical system 19, a propagation unit 20, a first post-stage optical system 21, a second post-stage optical system 22, the first detector 17, and the second detector 18.

The pre-stage optical system 19 includes either or both of a lens and a mirror, for example, and forms an image of the object ob that is located in the irradiation region of electromagnetic waves and becomes a subject of imaging.

It suffices for the propagation unit 20 to be provided at or near a primary image formation position, which is the position where the image of the object ob located at a predetermined position separate from the pre-stage optical system 19 is formed by the pre-stage optical system 19. In the present embodiment, the propagation unit 20 is provided at the primary image formation position.

The propagation unit 20 has an action surface "as" on which electromagnetic waves that pass through the pre-stage optical system 19 are incident. The action surface as is formed by a plurality of pixels (propagation elements) px aligned in a two-dimensional pattern. The action surface as is a surface that, in at least one of the first state and the second state described below, produces effects on the electromagnetic waves such as reflection and transmission.

The propagation unit 20 can switch each pixel px between a first state of propagating the electromagnetic waves incident on the action surface as in a first direction d1 and a second state of propagating the electromagnetic waves in a second direction d2. In the present embodiment, the first state is a first reflecting state of reflecting the electromagnetic waves incident on the action surface as towards the first direction d1. The second state is a second reflecting state of reflecting the electromagnetic waves incident on the action surface as towards the second direction d2.

In greater detail, the propagation unit 20 of the present embodiment includes a reflecting surface that reflects the electromagnetic waves on each pixel px. The propagation unit 20 switches each pixel px between the first reflecting state and the second reflecting state by changing the orientation of the reflecting surface of each pixel px.

In the present embodiment, the propagation unit 20 includes a digital micro mirror device (DMD), for example. The DMD can drive minute reflecting surfaces that configure the action surface as to switch the reflecting surface on each pixel px between inclined states of +12° and −12° relative to the action surface as. The action surface as is parallel to the board surface of a substrate on which the minute reflecting surfaces are mounted in the DMD.

Figure 2:
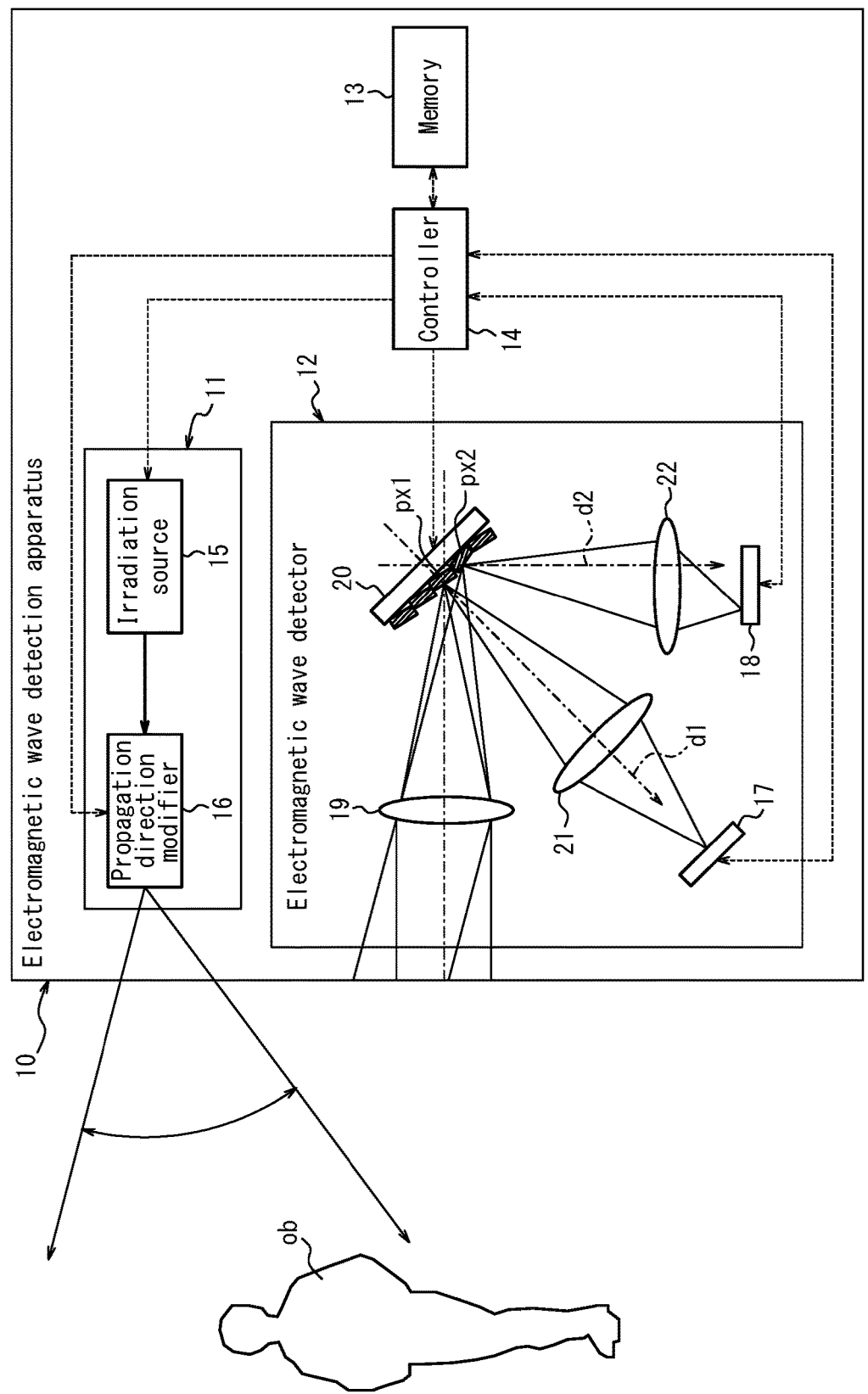
FIG. 2 is a configuration diagram of the electromagnetic wave detection apparatus to illustrate the propagation direction of electromagnetic waves in a first state and a second state of pixels in a propagation unit of the electromagnetic wave detection apparatus of FIG. 1.

The propagation unit 20 switches each pixel px between the first state and the second state in response to control by the controller 14, described below. For example, as illustrated in FIG. 2, the propagation unit 20 can simultaneously propagate electromagnetic waves incident on a portion of pixels px1 in the first direction d1 by switching the pixels px1 to the first state and propagate electromagnetic waves incident on another portion of pixels px2 in the second direction d2 by switching the pixels px2 to the second state. The propagation unit 20 can also propagate the electromagnetic waves incident on the same pixel px in the second direction d2 after the first direction d1 by switching the pixel px from the first state to the second state.

In the first state, each pixel px of the propagation unit 20 propagates the reflected waves of electromagnetic waves irradiated onto the object ob towards different detection elements of the first detector 17, described below, by irradiation position.

As illustrated in FIG. 1, the first post-stage optical system 21 is provided in the first direction d1 from the propagation unit 20. The first post-stage optical system 21 includes either or both of a lens and a mirror, for example. The first post-stage optical system 21 forms an image of the object ob represented by the electromagnetic waves whose propagation direction is switched at the propagation unit 20.

The second post-stage optical system 22 is provided in the second direction d2 from the propagation unit 20. The second post-stage optical system 22 includes either or both of a lens and a mirror, for example. The second post-stage optical system 22 forms an image of the object ob represented by the electromagnetic waves whose propagation direction is switched at the propagation unit 20.

The first detector 17 is provided along the path of electromagnetic waves that propagate through the first post-stage optical system 21 after propagating in the first direction d1 due to the propagation unit 20. The first detector 17 detects electromagnetic waves that pass through the first post-stage optical system 21, i.e. electromagnetic waves that propagate in the first direction d1.

The first detector 17 is a passive sensor that includes a plurality of detection elements. The detection elements are arranged in a plane perpendicular to the optical axis of the first post-stage optical system 21. In greater detail, the first detector 17 in the present embodiment includes a device array. For example, the first detector 17 includes an imaging device such as an image sensor or an imaging array, captures the image formed from electromagnetic waves at a detection surface, and generates image information corresponding to the imaged object ob. In greater detail, the first detector 17 in the present embodiment captures a visible light image. The first detector 17 transmits the generated image information to the controller 14 as a signal.

The first detector 17 detects the reflected waves of the electromagnetic waves irradiated onto the object ob from the irradiation source 15 via the propagation direction modifier 16, captures an image formed by the detected electromagnetic waves, and generates image information corresponding to the captured object ob. The detection elements detect the electromagnetic waves by irradiation position on the object ob.

The first detector 17 may capture an image other than a visible light image. The first detector 17 may include a thermo sensor. In this configuration, the electromagnetic wave detection apparatus 10 can acquire temperature information with the first detector 17.

In this way, the first detector 17 in the present embodiment includes a device array. Therefore, when an image is formed on the detection surface by incident electromagnetic waves, the image formed by the electromagnetic waves is incident on each detection element of the first detector 17, allowing an improvement in resolution. The first detector 17 is therefore preferably provided at a secondary image formation position, which is a position of image formation by the first post-stage optical system 21.

The second detector 18 is provided along the path of electromagnetic waves that propagate through the second post-stage optical system 22 after propagating in the second direction d2 due to the propagation unit 20. The second detector 18 detects electromagnetic waves that pass through the second post-stage optical system 22, i.e. electromagnetic waves that propagate in the second direction d2.

In the present embodiment, the second detector 18 is an active sensor that detects reflected waves, from the object ob, of electromagnetic waves irradiated towards the object ob from the irradiation source 15. The second detector 18 in the present embodiment detects reflected waves, from the object ob, of electromagnetic waves irradiated towards the object ob by being irradiated from the irradiation source 15 and reflected by the propagation direction modifier 16.

In greater detail, the second detector 18 of the present embodiment includes a device configured as a ranging sensor. For example, the second detector 18 includes a single device such as an Avalanche PhotoDiode (APD), a Photo-Diode (PD), or a ranging image sensor. The second detector 18 may include a device array, such as an APD array, a PD array, a ranging imaging array, or a ranging image sensor.

The second detector 18 detects reflected waves from a subject. In greater detail, the second detector 18 in the present embodiment detects electromagnetic waves in the infrared light band. Accordingly, the second detector 18 in the present embodiment cooperates with the propagation direction modifier 16 to form a scanning-type ranging sensor. The second detector 18 transmits detection information, indicating the detection of reflected waves, to the controller 14 as a signal.

It suffices for the single device configured as the above-described ranging sensor in the second detector 18 to be capable of detecting electromagnetic waves. Image formation at the detection surface is not required. The second detector 18 therefore need not be provided at a secondary image formation position, which is a position of image formation by the second post-stage optical system 22. In other words, as long as electromagnetic waves from all angles of view can be incident on the detection surface, the second detector 18 with this configuration may be disposed at any position along the path of electromagnetic waves that propagate in the second direction d2, due to the propagation unit 20, and subsequently pass through the second post-stage optical system 22.

The memory 13 may be configured by a semiconductor memory, a magnetic memory, or the like. The memory 13 stores a variety of information, data, programs for causing the electromagnetic wave detection apparatus 10 to operate, and the like. The memory 13 also functions as a working memory.

Figure 3:
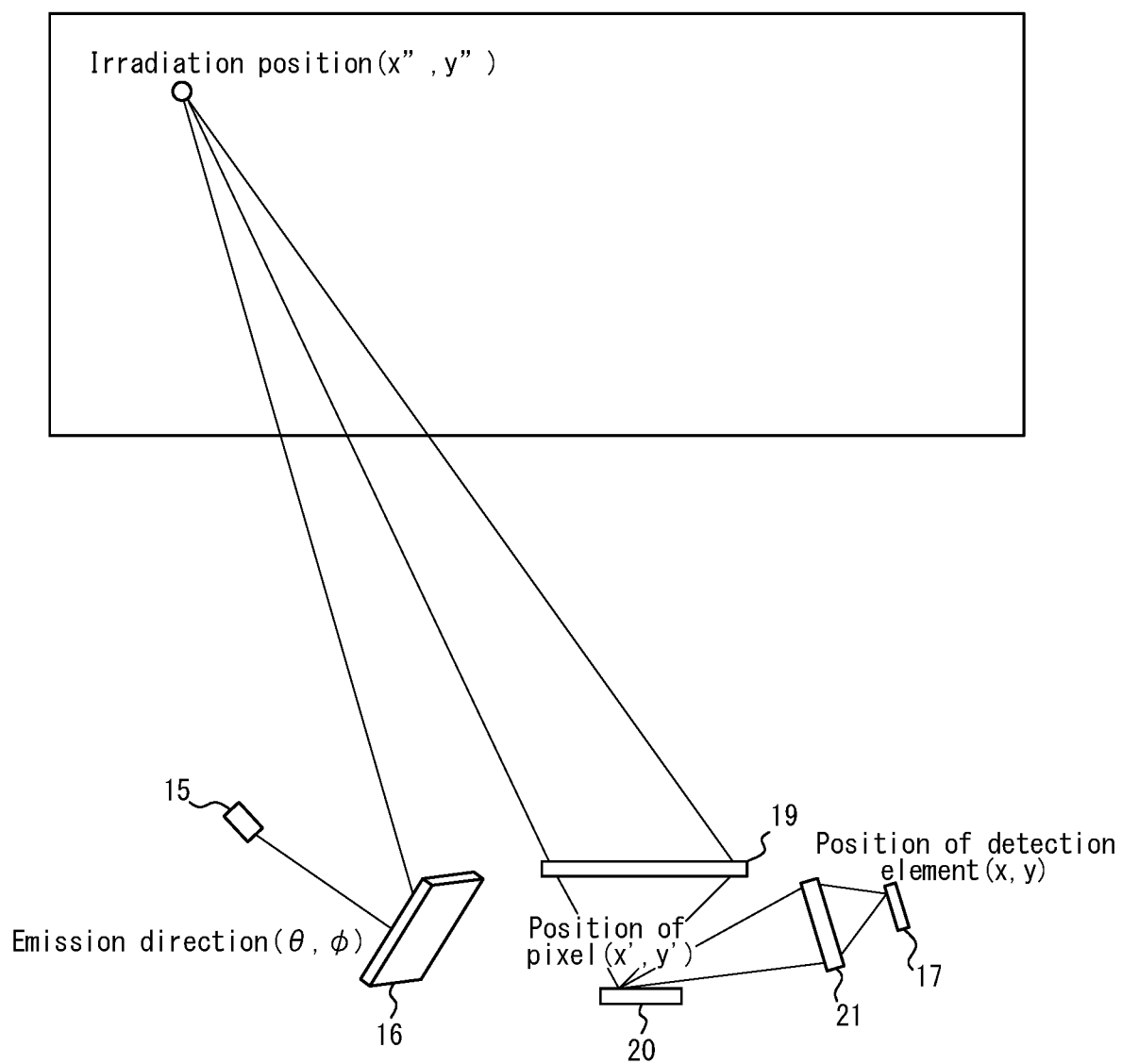
FIG. 3 is a conceptual diagram illustrating the positions, corresponding to an arbitrary emission direction, at each point along the path of emitted electromagnetic waves up to the first detector via an object in the electromagnetic wave detection apparatus of FIG. 1.

For example, the memory 13 stores related information. The related information includes information associating any two of the emission direction of electromagnetic waves and elements defining two points on a path of electromagnetic waves emitted in the emission direction from the irradiator 11 to the first detector 17 via the object ob. As illustrated in FIG. 3, the points on the path are points determined for an arbitrary emission direction, such as an irradiation position (x", y") within the irradiation region of electromagnetic waves, a position (x', y') of a pixel px on which reflected waves are incident in the propagation unit 20, and a position (x, y) of a detection element on which the reflected waves are incident in the first detector 17. For example, the related information includes first related information through seventh related information.

The first related information is information associating an emission direction of electromagnetic waves and the position of the detection element that detects the reflected waves of the electromagnetic waves emitted in the emission direction. The emission direction of electromagnetic waves refers to a variety of elements that define the emission direction.

In a configuration adopting the propagation direction modifier 16, as in the present embodiment, the first related information may be the inclination angle of the reflecting surface relative to a reference surface. The inclination angle may refer to the inclination angle relative to one axis, or inclination angles relative to two axes. As described above, when a plurality of irradiation sources 15 disposed in an array on a flat surface emit electromagnetic waves while shifting the phase little by little, the first related information may be the position identifying the irradiation source 15, among the plurality of irradiation sources 15, that is emitting electromagnetic waves.

The first related information is, for example, the position of the detection element as a function of the emission direction or the emission direction as a function of the detection element. The first related information may, for example, be the position (x, y) of the detection element associated individually with each emission direction (θ, φ), as illustrated in FIG. 4. The first related information may also be the emission direction associated individually with the position of each detection element.

The second related information is information associating an emission direction of electromagnetic waves and the irradiation position within the irradiation region of the electromagnetic waves emitted in the emission direction. The second related information is, for example, the irradiation position as a function of the emission direction or the emission direction as a function of the irradiation position. The second related information may, for example, be the irradiation position (x", y") associated individually with each emission direction (θ, φ), as illustrated in FIG. 5. The second related information may also be the emission direction associated individually with each irradiation position.

The third related information is information associating an irradiation position within the irradiation region of electromagnetic waves and the position of the detection element that detects the reflected waves of the electromagnetic waves irradiated onto the irradiation position. The third related information is, for example, the position of the detection element as a function of the irradiation position or the irradiation position as a function of the position of the detection element. The third related information may, for example, be the position (x, y) of the detection element associated individually with each irradiation position (x", y"), as illustrated in FIG. 6. The third related information may also be the irradiation position associated individually with the position of each detection element.

The fourth related information is information associating the position of the pixel px (propagation element) on which reflected waves of the electromagnetic waves are incident and the position of the detection element towards which the pixel px propagates the reflected waves. The fourth related information is, for example, the position of the detection element as a function of the position of the pixel px or the position of the pixel px as a function of the position of the detection element. The fourth related information may, for example, be the position (x, y) of the detection element associated individually with the position of each pixel px (x', y'), as illustrated in FIG. 7. The fourth related information may also be the position of the pixel px associated individually with the position of each detection element.

The fifth related information is information associating an emission direction of electromagnetic waves and the position of the pixel px (propagation element) on which reflected waves of the electromagnetic waves emitted in the emission direction are incident. The fifth related information is, for example, the position of the pixel px as a function of the emission direction or the emission direction as a function of the position of the pixel px. The fifth related information may, for example, be the position (x', y') of the pixel px associated individually with each emission direction (θ, φ), as illustrated in FIG. 8. The fifth related information may also be the emission direction associated individually with the position of each pixel px.

The sixth related information is information associating an irradiation position within the irradiation region of electromagnetic waves and the position of the pixel px (propagation element) on which reflected waves of the electromagnetic waves irradiated onto the irradiation position are incident. The sixth related information is, for example, the position of the pixel px as a function of the irradiation position or the irradiation position as a function of the position of the pixel px. The sixth related information may, for example, be the position (x', y') of the pixel px associated individually with each irradiation position (x", y"), as illustrated in FIG. 9. The sixth related information may also be the irradiation position associated individually with the position of each pixel px.

The seventh related information is information associating a drive signal and an emission direction of electromagnetic waves corresponding to the drive signal. The seventh related information is, for example, the emission direction as a function of the drive signal, or the drive signal as a function of the emission direction. The seventh related information may, for example, be the emission direction (θ, φ) associated individually with each of a plurality of signal values of the drive signal, as illustrated in FIG. 10. The seventh related information may also be a plurality of signal values of the drive signal associated individually with each emission direction. As described above, in a configuration in which the emission direction of the electromagnetic waves is fixed, the memory 13 may directly store the emission direction of the electromagnetic waves instead of the seventh related information.

The controller 14 includes one or more processors and a memory. The term "processor" encompasses either or both general-purpose processors that execute particular functions by reading particular programs and dedicated processors that are specialized for particular processing. The dedicated processor may include an application specific integrated circuit (ASIC). The processor may include a programmable logic device (PLD). The PLD may include a field-programmable gate array (FPGA). The controller 14 may include either or both of a system-on-a-chip (SoC) and a system in a package (SiP) that have one processor or a plurality of processors working together.

The controller 14 acquires information related to the surroundings of the electromagnetic wave detection apparatus 10 based on electromagnetic waves detected by each of the first detector 17 and the second detector 18. The information related to the surroundings may, for example, be image information, distance information, and temperature information.

In the present embodiment, the controller 14 acquires image information in the form of electromagnetic waves detected as an image by the first detector 17, as described above. Based on the detection information detected by the second detector 18, the controller 14 in the present embodiment also uses the time-of-flight (TOF) method to acquire distance information of the irradiation position irradiated by the irradiation source 15, as described below.

Figure 11:
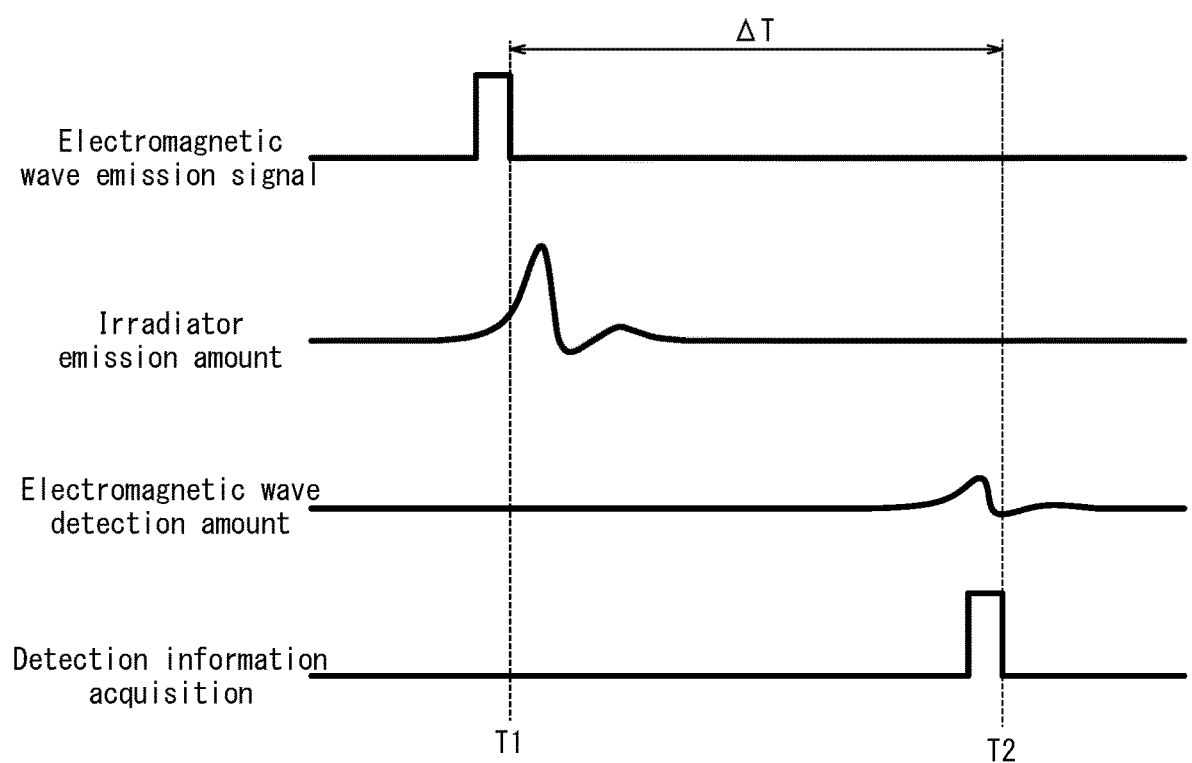
FIG. 11 is a timing chart of the timing of irradiation and detection of electromagnetic waves to illustrate the principle of ranging by a ranging sensor configured by an irradiator, a second detector, and a controller of FIG. 1.

As illustrated in FIG. 11, the controller 14 causes the irradiation source 15 to emit pulses of electromagnetic waves by inputting an electromagnetic wave emission signal to the irradiation source 15 (see the "electromagnetic wave emission signal" section). The irradiation source 15 irradiates electromagnetic waves based on the inputted electromagnetic wave emission signal (see the "irradiator emission amount" section). The electromagnetic waves emitted by the irradiation source 15 and reflected by the propagation direction modifier 16 to be irradiated onto an arbitrary irradiation region are reflected in the irradiation region.

The controller 14 may, for example, include a time measurement large scale integrated circuit (LSI) and measure a time ΔT from a timing T1 at which the controller 14 caused the irradiation source 15 to emit electromagnetic waves to a timing T2 at which the controller 14 acquires the detection information (see the "detection information acquisition" section). The controller 14 multiplies the time ΔT by the speed of light and divides by two to calculate the distance to the irradiation position.

The controller 14 outputs the drive signal to the propagation direction modifier 16. The controller 14 also reads the second related information and the seventh related information from the memory 13. The controller 14 calculates the irradiation position based on an outputted drive signal, the seventh related information, and the second related information. By calculating the distance to the irradiation position while changing the irradiation position using the drive signal, the controller 14 creates distance information in the image information acquired from the first detector 17.

In the present embodiment, the electromagnetic wave detection apparatus 10 is configured to create distance information by direct ToF, in which the time is directly measured from when laser light is irradiated until the laser light returns. The electromagnetic wave detection apparatus 10 is not, however, limited to this configuration. For example, the electromagnetic wave detection apparatus 10 may create distance information by flash ToF, in which electromagnetic waves are irradiated with a constant period, and the time until return is measured indirectly from the phase difference between the irradiated electromagnetic waves and the returning electromagnetic waves. The electromagnetic wave detection apparatus 10 may also create distance information by another ToF method, such as phased ToF.

The controller 14 controls the irradiation source 15, the propagation direction modifier 16, the propagation unit 20, the first detector 17, and the second detector 18 to repeatedly acquire the image information and the distance information. The control of each portion to repeatedly acquire the image information and the distance information is described below with reference to the timing chart in FIG. 12.

Figure 12:
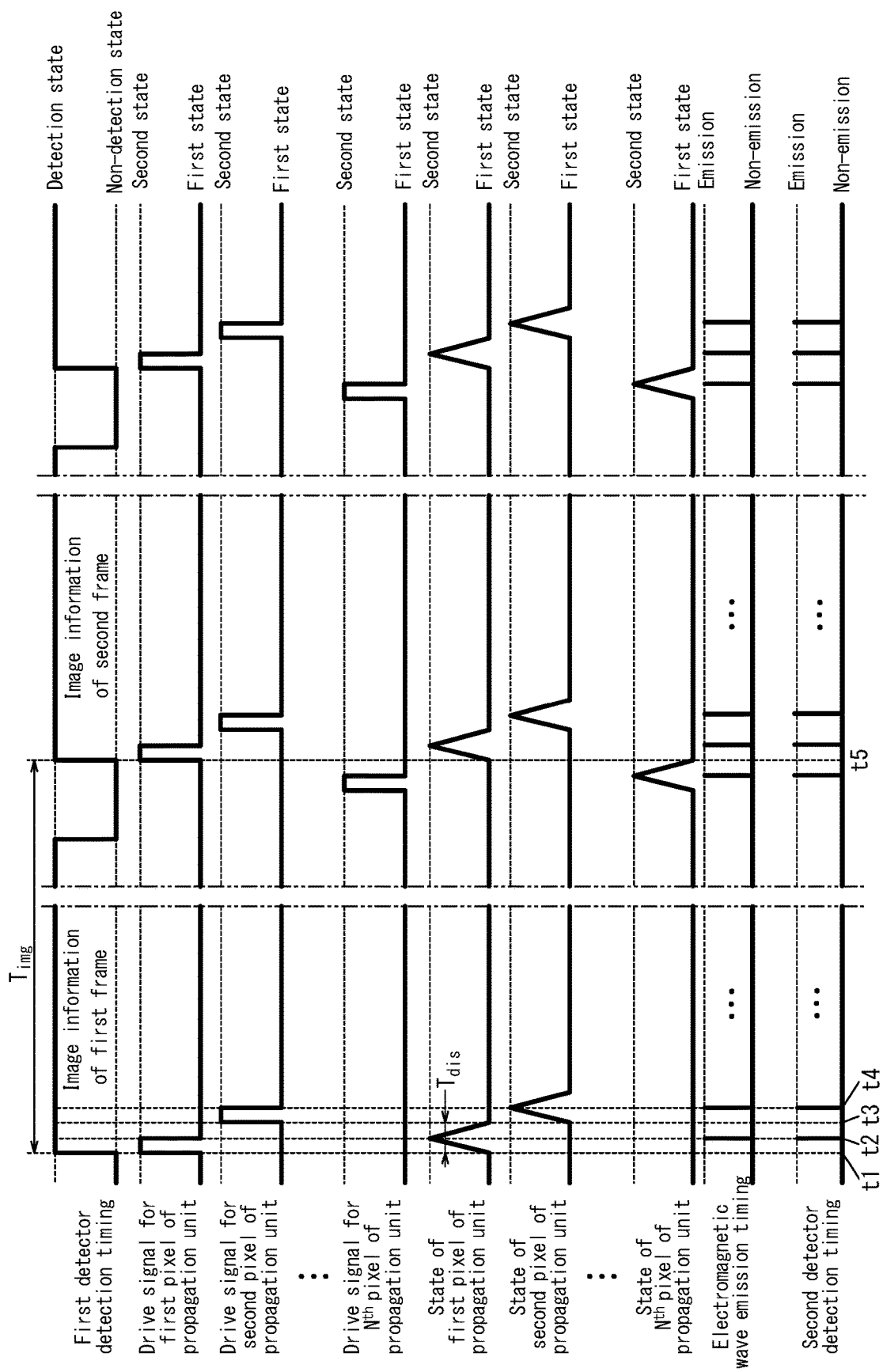
FIG. 12 is a timing chart to illustrate control of each portion for the controller of FIG. 1 to repeatedly acquire image information and distance information.
Figure 13:
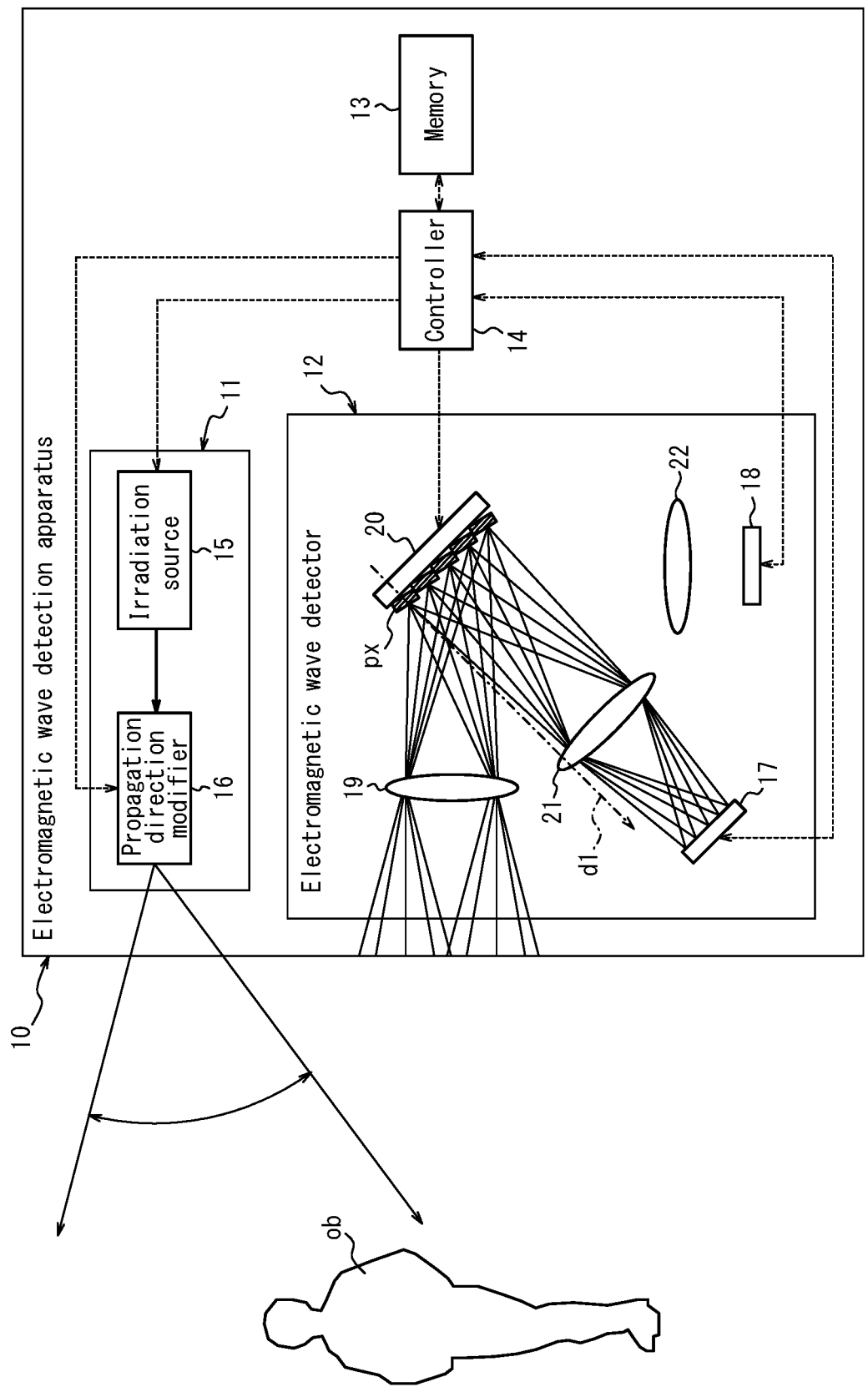
FIG. 13 is a configuration diagram of the electromagnetic wave detection apparatus to illustrate the propagation state of electromagnetic waves when an arbitrary pixel of the propagation unit of FIG. 1 is in the first state.

At timing t1, the controller 14 causes the first detector 17 to start detecting electromagnetic waves for generating image information of a first frame. At timing t1, all of the pixels px of the propagation unit 20 are in the first state, and the electromagnetic waves incident on the pre-stage optical system 19 reach the first detector 17 (see FIG. 13). At timing t1, the controller 14 also starts the switching of the first pixel px in the propagation unit 20 from the first state to the second state (see "drive signal for first pixel of propagation unit" section), as illustrated in FIG. 12. At timing t1, all of the other pixels px remain in the first state (see "state of second pixel of propagation unit", "state of $N^{th}$ pixel of propagation unit" sections).

Figure 14:
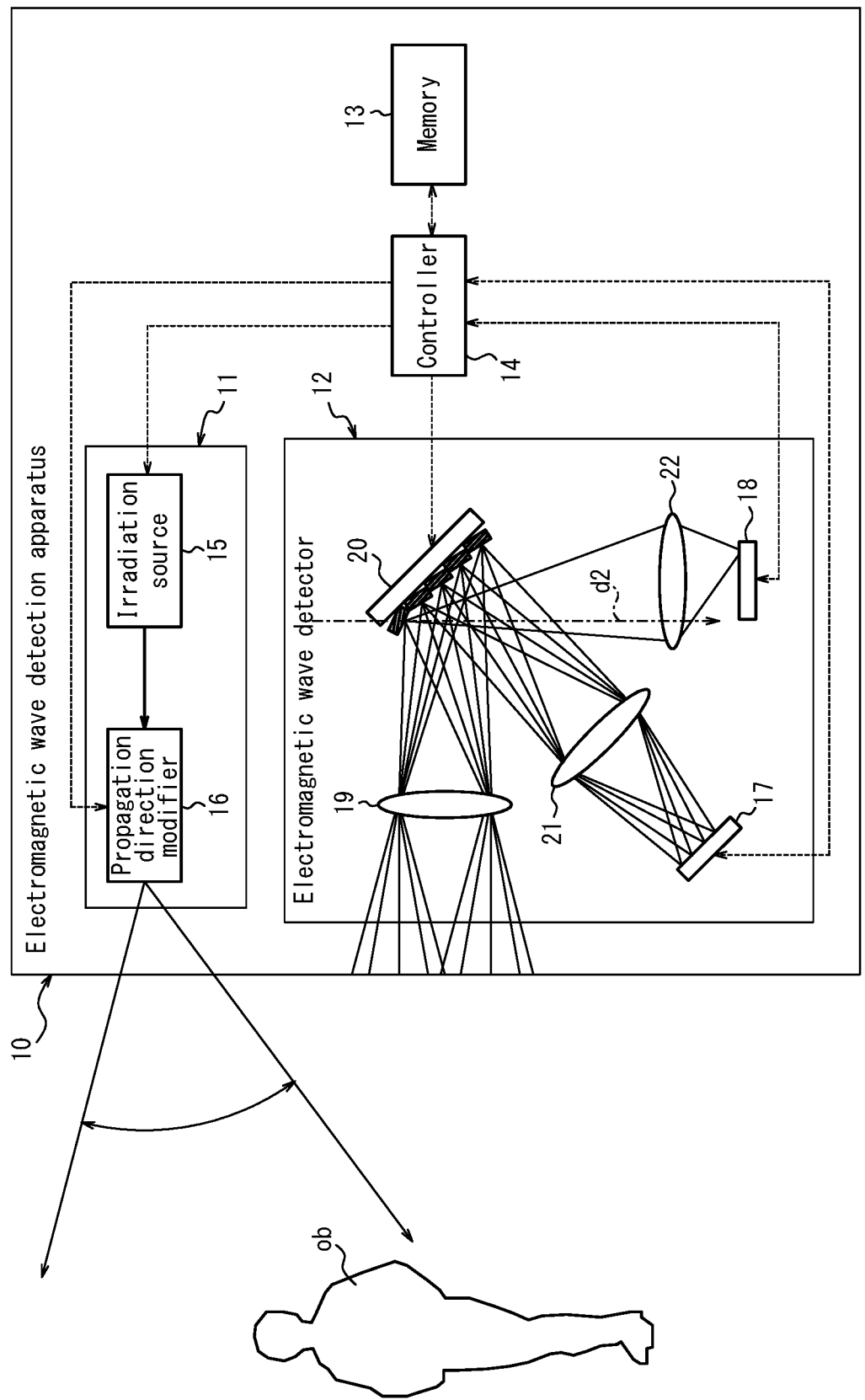
FIG. 14 is a configuration diagram of the electromagnetic wave detection apparatus to illustrate the propagation state of electromagnetic waves when only the arbitrary pixel of FIG. 13 is in the second state.

At timing t2, which is when switching of the second pixel px of the propagation unit 20 from the first state to the second state is complete (see "state of first pixel of propagation unit" section), the controller 14 causes the irradiation source 15 to emit electromagnetic waves (see "electromagnetic wave emission timing" section). At timing t2, the first pixel px of the propagation unit 20 switches from the first state (see FIG. 13) to the second state, and the electromagnetic waves that are incident on the pre-stage optical system 19 and form an image on the first pixel px of the propagation unit 20 propagate in the second direction d2 after the first direction d1 (see FIG. 14).

As illustrated in FIG. 12, the controller 14 causes the second detector 18 to detect electromagnetic waves at timing t2 (see "second detector detection timing" section). The time it takes from when the irradiation source 15 irradiates the electromagnetic waves until the electromagnetic waves reach the electromagnetic wave detection apparatus 10 is extremely short compared to the detection time for generating the image information and is, for example, on the order of nanoseconds. Therefore, detection of electromagnetic waves by the second detector 18 is complete in a negligible time and is considered to be the timing t2. The controller 14 acquires the distance information at the irradiation position corresponding to the first pixel px of the propagation unit 20 by calculation based on the drive signal transmitted to the propagation direction modifier 16 at timing t2.

Furthermore, at timing t2, the controller 14 starts the switching of the first pixel px in the propagation unit 20 from the second state to the first state (see "drive signal for first pixel of propagation unit" section). In this way, the controller 14 switches the first pixel px in the propagation unit 20 from the second state to the first state and can thereby cause the detection element in the first detector 17 corresponding to the first pixel px to detect the electromagnetic waves (visible light) again.

At timing t3, which is when switching of the first pixel px of the propagation unit 20 from the second state to the first state is complete (see "state of first pixel of propagation unit" section), the controller 14 starts the switching of the second pixel px in the propagation unit 20 from the first state to the second state (see "drive signal for second pixel of propagation unit" section). At timing t3, all of the other pixels px remain in the first state (see "state of first pixel of propagation unit", "state of $N^{th}$ pixel of propagation unit" sections).

At timing t4, which is when switching of the second pixel px of the propagation unit 20 from the first state to the second state is complete (see "state of second pixel of propagation unit" section), the controller 14 causes the irradiation source 15 to emit electromagnetic waves (see "electromagnetic wave emission timing" section). At timing t4, the second pixel px of the propagation unit 20 switches from the first state to the second state, and the electromagnetic waves that are incident on the pre-stage optical system 19 and form an image on the second pixel px of the propagation unit 20 propagate in the second direction d2 after the first direction d1. The controller 14 causes the second detector 18 to detect electromagnetic waves at timing t4 (see "second detector detection timing" section). The controller 14 acquires the distance information at the irradiation position corresponding to the second pixel px of the propagation unit 20 by calculation based on the drive signal transmitted to the propagation direction modifier 16 at timing t4.

Furthermore, at timing t4, the controller 14 starts the switching of the second pixel px in the propagation unit 20 from the second state to the first state (see "drive signal for second pixel of propagation unit" section). In this way, the controller 14 switches the second pixel px in the propagation unit 20 from the second state to the first state and can thereby cause the detection element in the first detector 17 corresponding to the second pixel px to detect the electromagnetic waves (visible light) again.

The controller 14 subsequently switches the third pixel px to the $N^{th}$ pixel px in the propagation unit 20 in order, in the same way as the first pixel px, from the first state to the second state and from the second state to the first state. The controller 14 thereby acquires image information of the first frame along with distance information at the irradiation position corresponding to each pixel px.

As described above, the controller 14 is configured to perform control to start switching of the $M^{th}$ pixel px from the first state to the second state at the timing at which switching of the $(M-1)^{th}$ pixel px from the second state to the first state is complete. In this configuration, the propagation unit 20 can switch $T_{img}/T_{dis}$ pixels px from the first state to the second state in a time $T_{img}$ for generating one frame of image information.

In other words, the controller 14 can generate distance information for $T_{img}/T_{dis}$ pixels px in the time $T_{img}$. M is an integer satisfying $2 \le M \le N$. $T_{dis}$ is the sum of the time required for switching a pixel px of the propagation unit 20 from the first state to the second state and the time required to return from the second state to the first state. In other words, $T_{dis}$ is the time required to switch an arbitrary pixel px in order from the first state to the second state and back to the first state. In the present embodiment, $T_{img}$ is 1/60 s, for example, and $T_{dis}$ is 1/3000 s.

In a configuration in which the value of $T_{img}/T_{dis}$ is less than the number of pixels in the propagation unit 20, the controller 14 cannot switch all of the pixels px in the propagation unit 20 during the time $T_{img}$. Therefore, during the generation of one frame of image information, the controller 14 cannot generate distance information corresponding to the frame of image information. In other words, during the generation of one frame of image information, the controller 14 can only generate distance information corresponding to less than the frame of image information (for example, 0.5 frames).

To address this issue in a configuration in which the value of $T_{img}/T_{dis}$ is less than the number of pixels in the propagation unit 20, the controller 14 selects a smaller number of pixels px than $T_{img}/T_{dis}$ as targets of switching from among all of the pixels px in the propagation unit 20. Furthermore, the controller 14 transmits a drive signal to the propagation direction modifier 16 so that, at the timing of switching to the second state for each pixel px selected as a target of switching, electromagnetic waves are irradiated onto a region corresponding to the pixel px within the irradiation region.

In a configuration in which the value of $T_{img}/T_{dis}$ is less than the number of pixels in the propagation unit 20, the controller 14 may also perform control so that switching of all pixels px in the propagation unit 20 is complete during a time $P \times T_{img}$ for generating the image information of a plurality of frames (P frames, where P is a positive number satisfying P>1). Furthermore, the controller 14 transmits a drive signal to the propagation direction modifier 16 so that, at the timing of switching of each pixel px of the propagation unit 20, electromagnetic waves are irradiated onto a region corresponding to the pixel px within the irradiation region.

In a configuration in which the value of $T_{img}/T_{dis}$ is less than the number of pixels in the propagation unit 20, the controller 14 may divide all of the pixels px in the propagation unit 20 into groups of $T_{img}/T_{dis}$ or fewer pixels px and collectively switch pixels px group by group. Furthermore, the controller 14 may transmit a drive signal to the propagation direction modifier 16 so that, at the timing of switching of a pixel px at a position representative of each group (for example, the central position of each group), electromagnetic waves are irradiated onto a region corresponding to the pixel px within the irradiation region.

In a configuration in which the value of $T_{img}/T_{dis}$ is less than the number of pixels in the propagation unit 20, the controller 14 may divide all of the pixels px in the propagation unit 20 into groups of $T_{img}/T_{dis}$ or fewer pixels px and switch only a certain pixel px in each group. Furthermore, the controller 14 may transmit a drive signal to the propagation direction modifier 16 so that, at the timing of switching of the certain pixel px, electromagnetic waves are irradiated onto a region corresponding to the pixel px within the irradiation region.

The detection element in the first detector 17 corresponding to a pixel px, of the propagation unit 20, switched to the second state during the capturing time of an image of one frame cannot receive light while the pixel px is in the second state. Therefore, the signal strength dependent on this detection element in the first detector 17 is reduced. The controller 14 may compensate for the reduced signal strength by multiplying the signal value of the detection element in the first detector 17 by a gain. The capturing time of an image of one frame corresponds to the time when the first detector 17 detects electromagnetic waves for generating one frame of image information.

In a configuration in which the scanning rate by the propagation direction modifier 16 is faster than the switching rate of a pixel px, i.e. when $T_{sen}$, is shorter than $T_{dis}$, the controller 14 may start switching of the $M^{th}$ pixel px from the first state to the second state before the timing at which switching of the $(M-1)^{th}$ pixel px from the second state to the first state is complete.

$T_{sen}$ is the time required for the irradiation position of electromagnetic waves emitted from the irradiation source 15 and reflected by the propagation direction modifier 16 to change from a certain irradiation position to the next irradiation position, or the time required to change from a certain irradiation position to an adjacent irradiation position. In this configuration, distance information can be generated at more pixels in a shorter time than when another pixel is switched to the second state only after switching of an arbitrary pixel px from the second state to the first state is complete.

The controller 14 starts detection of electromagnetic waves for generating image information of a second frame at t5, which is when the time $T_{img}$ required to generate image information of the first frame has elapsed from timing t1 (see "first detector detection timing" section). After detection of electromagnetic waves by the first detector 17 from timing t1 to t5 is finished, the controller 14 acquires the image information of the first frame based on the electromagnetic waves detected during that time. Subsequently, the controller 14 controls the irradiation source 15, the propagation direction modifier 16, the propagation unit 20, the first detector 17, and the second detector 18 to acquire the image information and the distance information in the same way as the control from timing t1 to t5.

The controller 14 also controls the irradiation source 15, the propagation direction modifier 16, the propagation unit 20, and the first detector 17 to update the related information. In the present embodiment, the controller 14 updates the related information by updating any of the first related information through the sixth related information. The related information to be updated can be selected from among the first related information through the sixth related information. The related information may be selected automatically or manually. In the present embodiment, for example, the operator can make a selection via an input device of the electromagnetic wave detection apparatus 10. Details on the updating of the related information are provided below.

When updating one of the first related information through the sixth related information, the controller 14 switches all of the pixels px of the propagation unit 20 to the first reflecting state to update the first related information. The controller 14 transmits a drive signal with an arbitrary signal value to the propagation direction modifier 16. The controller 14 reads the seventh related information from the memory 13. Based on the seventh related information, the controller 14 calculates the emission direction corresponding to the signal value of the transmitted drive signal.

When updating one of the first related information through the sixth related information, the controller 14 causes the first detector 17 to detect reflected waves of the electromagnetic waves. The controller 14 distinguishes the position of the detection element, among the plurality of detection elements, that detects the reflected waves. When a plurality of detection elements detects the reflected waves, the controller 14 distinguishes the position of the detection element for which the strength of the reflected waves that are detected is greatest.

Subsequent operations by the controller 14 differ for each of the first related information through the sixth related information and are therefore described separately.

When updating the first related information, the controller 14 stores a combination of the calculated emission direction and the distinguished position of the detection element in the memory 13. The controller 14 calculates the emission direction for the drive signal of each of a plurality of signal values and distinguishes the corresponding position of the detection element that detects the reflected waves. The controller 14 combines the emission directions and the positions of the detection elements. The controller 14 updates the first related information based on a plurality of these combinations.

For example, when the first related information is a function yielding the position of the detection element as a function of the emission direction, the controller 14 updates the function based on the plurality of combinations. The controller 14 stores the updated function as the new relationship between the emission direction and the position of the detection element, i.e. as the new first related information, in the memory 13.

When, for example, the first related information is the position of the detection element corresponding individually to each emission direction, the controller 14 stores the position of the detection element in each combination stored in the memory 13 as the new position of the detection element associated with the corresponding emission direction in the combination, i.e. as the new first related information, in the memory 13.

When, for example, the first related information is the emission direction corresponding individually to each position of the detection element, the controller 14 stores the emission direction in each combination stored in the memory 13 as the new emission direction associated with the corresponding position of the detection element in the combination, i.e. as the new first related information, in the memory 13.

When updating the second related information, the controller 14 reads the third related information from the memory 13. Based on the third related information, the controller 14 calculates the irradiation position corresponding to the position of the detection element that detects the reflected waves. The controller 14 can calculate the irradiation position, corresponding to the position of the detection element that detects the reflected waves, based on the fourth related information and the sixth related information instead of the third related information.

The controller 14 stores a combination of the calculated emission direction and the calculated irradiation position in the memory 13. The controller 14 calculates the emission direction for the drive signal of each of a plurality of signal values and calculates the irradiation position corresponding to the position of the detection element that detects the reflected waves. The controller 14 combines the emission directions and irradiation positions. The controller 14 updates the second related information based on a plurality of these combinations.

For example, when the second related information is a function yielding the irradiation position as a function of the emission direction, the controller 14 updates the function based on the plurality of combinations. The controller 14 stores the updated function as the new relationship between the emission direction and the irradiation position, i.e. as the new second related information, in the memory 13.

When, for example, the second related information is the irradiation position corresponding individually to each emission direction, the controller 14 stores the irradiation position in each combination stored in the memory 13 as the new irradiation position associated with the corresponding emission direction in the combination, i.e. as the new second related information, in the memory 13.

When, for example, the second related information is the emission direction corresponding individually to each irradiation position, the controller 14 stores the emission direction in each combination stored in the memory 13 as the new emission direction associated with the corresponding irradiation position in the combination, i.e. as the new second related information, in the memory 13.

When updating the third related information, the controller 14 reads the second related information from the memory 13. Based on the second related information, the controller 14 calculates the irradiation position corresponding to the calculated emission direction.

The controller 14 stores a combination of the calculated irradiation position and the position of the detection element that detects the reflected waves in the memory 13. The controller 14 calculates the irradiation position for the drive signal of each of a plurality of signal values and distinguishes the corresponding position of the detection element that detects the reflected waves. The controller 14 combines the irradiation positions and the positions of the detection elements. The controller 14 updates the third related information based on a plurality of these combinations.

For example, when the third related information is a function yielding the position of the detection element as a function of the irradiation position, the controller 14 updates the function based on the plurality of combinations. The controller 14 stores the updated function as the new relationship between the irradiation position and the position of the detection element, i.e. as the new third related information, in the memory 13.

When, for example, the third related information is the position of the detection element corresponding individually to each irradiation position, the controller 14 stores the position of the detection element in each combination stored in the memory 13 as the new position of the detection element associated with the corresponding irradiation position in the combination, i.e. as the new third related information, in the memory 13.

When, for example, the third related information is the irradiation position corresponding individually to each position of the detection element, the controller 14 stores the irradiation position in each combination stored in the memory 13 as the new irradiation position associated with the corresponding position of the detection element in the combination, i.e. as the new third related information, in the memory 13.

When updating the fourth related information, the controller 14 reads the fifth related information from the memory 13. Based on the fifth related information, the controller 14 calculates the position of the pixel px corresponding to the calculated emission direction.

The controller 14 stores a combination of the calculated position of the pixel px and the position of the detection element that detects the reflected waves in the memory 13. The controller 14 calculates the position of the pixel px for the drive signal of each of a plurality of signal values and distinguishes the corresponding position of the detection element that detects the reflected waves. The controller 14 combines the positions of the pixels px and the positions of the detection elements. The controller 14 updates the fourth related information based on a plurality of these combinations.

For example, when the fourth related information is a function yielding the position of the detection element as a function of the position of the pixel px, the controller 14 updates the function based on the plurality of combinations. The controller 14 stores the updated function as the new relationship between the position of the pixel px and the position of the detection element, i.e. as the new fourth related information, in the memory 13.

When, for example, the fourth related information is the position of the detection element corresponding individually to each position of the pixel px, the controller 14 stores the position of the detection element in each combination stored in the memory 13 as the new position of the detection element associated with the corresponding position of the pixel px in the combination, i.e. as the new fourth related information, in the memory 13.

When, for example, the fourth related information is the position of the pixel px corresponding individually to each position of the detection element, the controller 14 stores the position of the pixel px in each combination stored in the memory 13 as the new position of the pixel px associated with the corresponding position of the detection element in the combination, i.e. as the new fourth related information, in the memory 13.

When updating the fifth related information, the controller 14 reads the fourth related information from the memory 13. Based on the fourth related information, the controller 14 calculates the position of the pixel px corresponding to the position of the detection element that detects the reflected waves.

The controller 14 stores a combination of the calculated emission direction and the position of the pixel px in the memory 13. The controller 14 calculates the emission direction for the drive signal of each of a plurality of signal values and calculates the position of the pixel px corresponding to the position of the detection element that detects the reflected waves. The controller 14 combines the emission directions and the positions of the pixels px. The controller 14 updates the fifth related information based on a plurality of these combinations.

For example, when the fifth related information is a function yielding the position of the pixel px as a function of the emission direction, the controller 14 updates the function based on the plurality of combinations. The controller 14 stores the updated function as the new relationship between the emission direction and the position of the pixel px, i.e. as the new fifth related information, in the memory 13.

When, for example, the fifth related information is the position of the pixel px corresponding individually to each emission direction, the controller 14 stores the position of the pixel px in each combination stored in the memory 13 as the new position of the pixel px associated with the corresponding emission direction in the combination, i.e. as the new fifth related information, in the memory 13.

When, for example, the fifth related information is the emission direction corresponding individually to each position of the pixel px, the controller 14 stores the emission direction in each combination stored in the memory 13 as the new emission direction associated with the corresponding position of the pixel px in the combination, i.e. as the new fifth related information, in the memory 13.

When updating the sixth related information, the controller 14 reads the second related information and the fourth related information from the memory 13. Based on the second related information, the controller 14 calculates the irradiation position corresponding to the calculated emission direction. Based on the fourth related information, the controller 14 calculates the position of the pixel px corresponding to the position of the detection element that detects the reflected waves.

The controller 14 stores a combination of the calculated irradiation position and the position of the pixel px in the memory 13. The controller 14 calculates the irradiation position for the drive signal of each of a plurality of signal values and calculates the position of the pixel px corresponding to the position of the detection element that detects the reflected waves. The controller 14 combines the irradiation positions and the positions of the pixels px. The controller 14 updates the sixth related information based on a plurality of these combinations.

For example, when the sixth related information is a function yielding the position of the pixel px as a function of the irradiation position, the controller 14 updates the function based on the plurality of combinations. The controller 14 stores the updated function as the new relationship between the irradiation position and the position of the pixel px, i.e. as the new sixth related information, in the memory 13.

When, for example, the sixth related information is the position of the pixel px corresponding individually to each irradiation position, the controller 14 stores the position of the pixel px in each combination stored in the memory 13 as the new position of the pixel px associated with the corresponding irradiation position in the combination, i.e. as the new sixth related information, in the memory 13.

When, for example, the sixth related information is the irradiation position corresponding individually to each position of the pixel px, the controller 14 stores the irradiation position in each combination stored in the memory 13 as the new irradiation position associated with the corresponding position of the pixel px in the combination, i.e. as the new sixth related information, in the memory 13.

Figure 15:
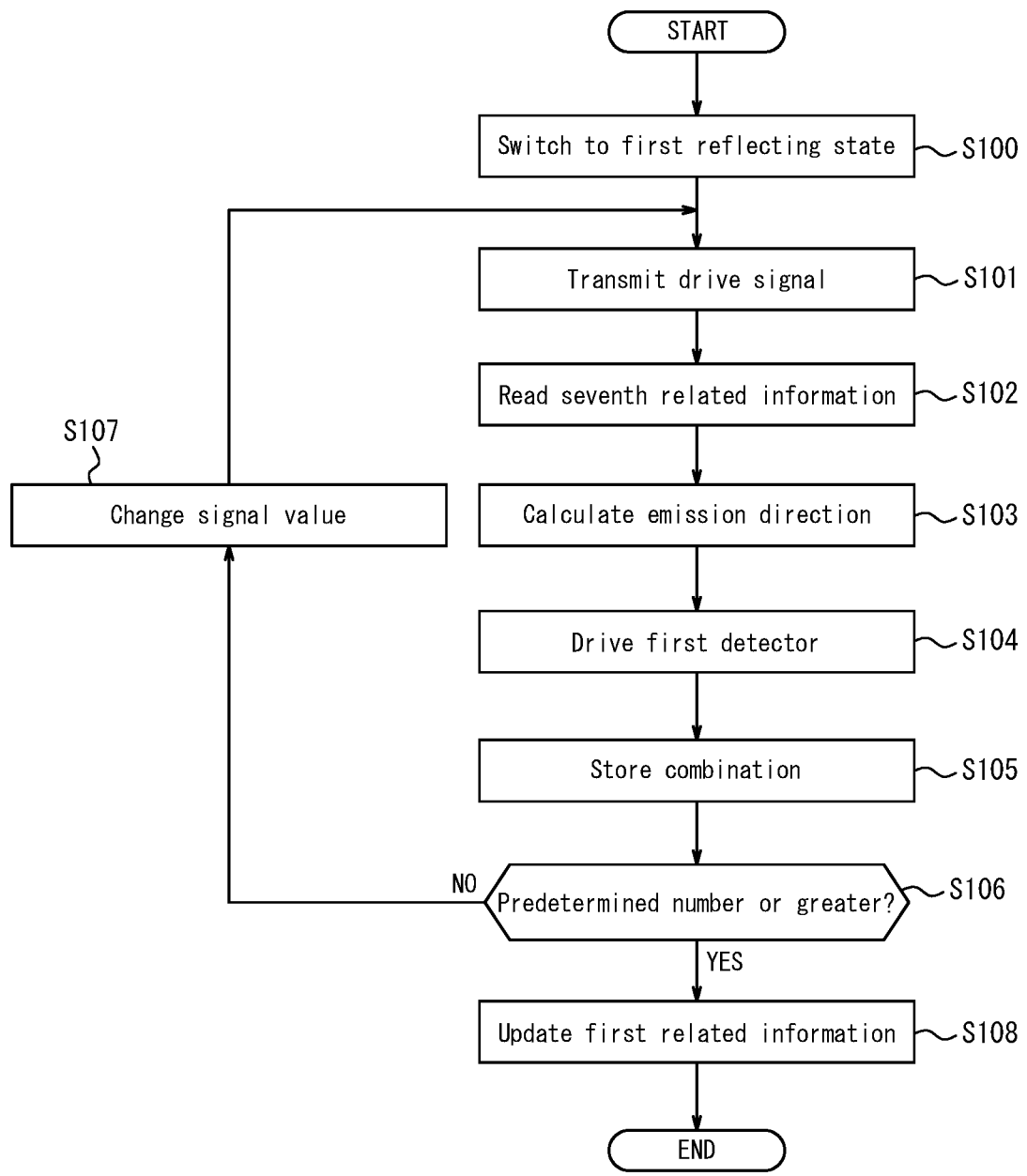
FIG. 15 is a flowchart illustrating processing, executed by the controller of FIG. 1, to update the first related information.

Next, the processing executed by the controller 14 in the present embodiment to update the first related information is described with reference to the flowchart of FIG. 15. The controller 14 starts the processing to update the first related information when, for example, an input device of the electromagnetic wave detection apparatus 10 detects an operation to execute the processing to update the first related information.

In step S100, the controller 14 switches all of the pixels px of the propagation unit 20 to the first reflecting state. When the controller 14 has switched all of the pixels px to the first reflecting state, the process proceeds to step S101.

In step S101, the controller 14 transmits a drive signal with an arbitrary signal value to the propagation direction modifier 16 to cause electromagnetic waves to be irradiated onto the irradiation position corresponding to the signal value. After the controller 14 transmits the drive signal, the process proceeds to step S102.

In step S102, the controller 14 reads the seventh related information from the memory 13. After the controller 14 reads the seventh related information, the process proceeds to step S103.

In step S103, the controller 14 uses the seventh related information read in step S102 to calculate the emission direction corresponding to the signal value of the drive signal transmitted in step S101. After the controller 14 calculates the emission direction, the process proceeds to step S104.

In step S104, the controller 14 drives the first detector 17 to capture an image. The controller 14 acquires image information generated by capturing of the image. In the acquired image information, the controller 14 distinguishes the position of the detection element for which the strength of the reflected waves that were detected is greatest. After the controller 14 distinguishes the position of the detection element, the process proceeds to step S105.

In step S105, the controller 14 stores a combination of the emission direction calculated in step S103 and the position of the detection element distinguished in step S104 in the memory 13. After the controller 14 stores the combination, the process proceeds to step S106.

In step S106, the controller 14 judges whether the number of combinations stored in step S105 is a predetermined number or greater. When the number of combinations is not the predetermined number or greater, the process proceeds to step S107. When the number of combinations is the predetermined number or greater, the process proceeds to step S108.

In step S107, the controller 14 changes the signal value of the drive signal. After the controller 14 changes the signal value, the process returns to step S101.

In step S108, the controller 14 uses the combinations stored in step S105 to update the first related information stored in the memory 13. After updating the first related information, the controller 14 ends the processing to update the first related information.

Figure 16:
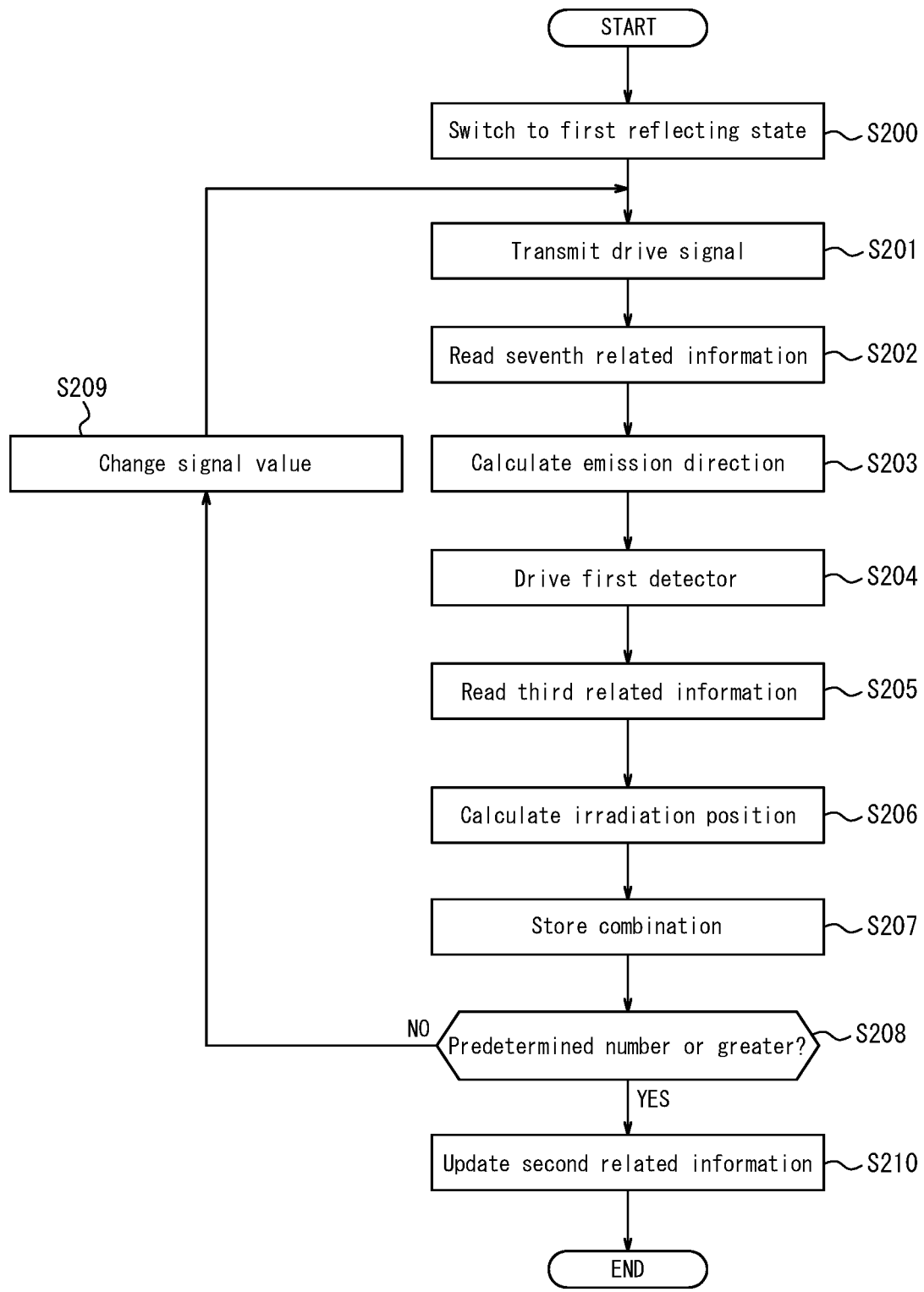
FIG. 16 is a flowchart illustrating processing, executed by the controller of FIG. 1, to update the second related information.

Next, the processing executed by the controller 14 in the present embodiment to update the second related information is described with reference to the flowchart of FIG. 16. The controller 14 starts the processing to update the second related information when, for example, an input device of the electromagnetic wave detection apparatus 10 detects an operation to execute the processing to update the second related information.

In steps S200 to S204, the controller 14 executes the same processing as in steps S100 to S104 of the processing to update the first related information. After the controller 14 distinguishes the position of the detection element in step S204, the process proceeds to step S205.

In step S205, the controller 14 reads the third related information from the memory 13. After the controller 14 reads the third related information, the process proceeds to step S206.

In step S206, the controller 14 uses the third related information read in step S205 to calculate the irradiation position corresponding to the position of the detection element distinguished in step S204. After the controller 14 calculates the irradiation position, the process proceeds to step S207.

In step S207, the controller 14 stores a combination of the emission direction calculated in step S203 and the irradiation position calculated in step S206 in the memory 13. After the controller 14 stores the combination, the process proceeds to step S208.

In steps S208 and S209, the controller 14 executes the same processing as in steps S106 and S107 of the processing to update the first related information. When the number of combinations is the predetermined number or greater in step S208, the process proceeds to step S210.

In step S210, the controller 14 uses the combinations stored in step S207 to update the second related information stored in the memory 13. After updating the second related information, the controller 14 ends the processing to update the second related information.

Figure 17:
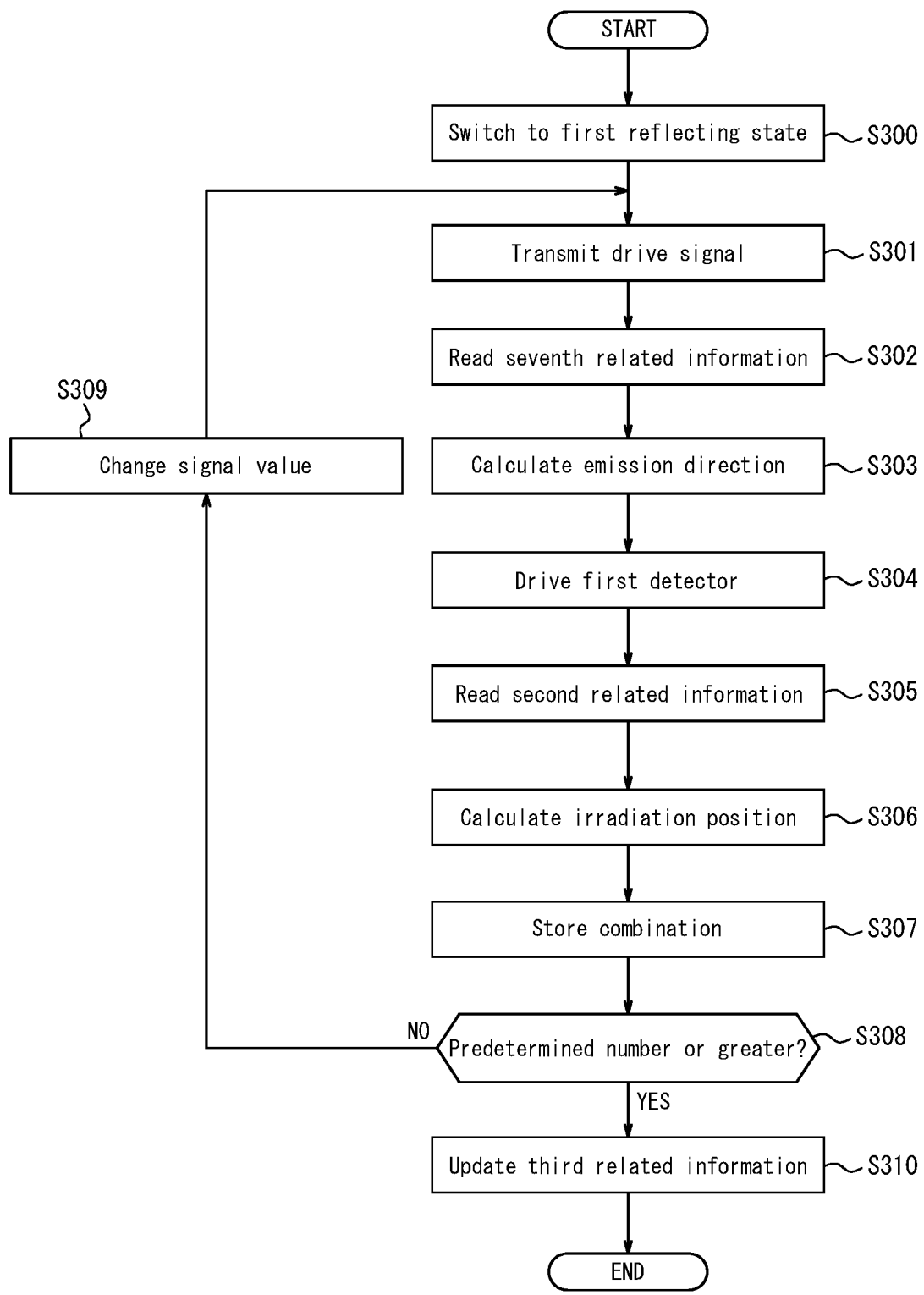
FIG. 17 is a flowchart illustrating processing, executed by the controller of FIG. 1, to update the third related information.

Next, the processing executed by the controller 14 in the present embodiment to update the third related information is described with reference to the flowchart of FIG. 17. The controller 14 starts the processing to update the third related information when, for example, an input device of the electromagnetic wave detection apparatus 10 detects an operation to execute the processing to update the third related information.

In steps S300 to S304, the controller 14 executes the same processing as in steps S100 to S104 of the processing to update the first related information. After the controller 14 distinguishes the position of the detection element in step S304, the process proceeds to step S305.

In step S305, the controller 14 reads the third related information from the memory 13. After the controller 14 reads the third related information, the process proceeds to step S306.

In step S306, the controller 14 uses the third related information read in step S305 to calculate the irradiation position corresponding to the emission direction calculated in step S303. After the controller 14 calculates the irradiation position, the process proceeds to step S307.

In step S307, the controller 14 stores a combination of the irradiation position calculated in step S306 and the position of the detection element distinguished in step S304 in the memory 13. After the controller 14 stores the combination, the process proceeds to step S308.

In steps S308 and S309, the controller 14 executes similar processing as in steps S106 and S107 of the processing to update the first related information. When the number of combinations is the predetermined number or greater in step S308, the process proceeds to step S310.

In step S310, the controller 14 uses the combinations stored in step S307 to update the third related information stored in the memory 13. After updating the third related information, the controller 14 ends the processing to update the third related information.

Figure 18:
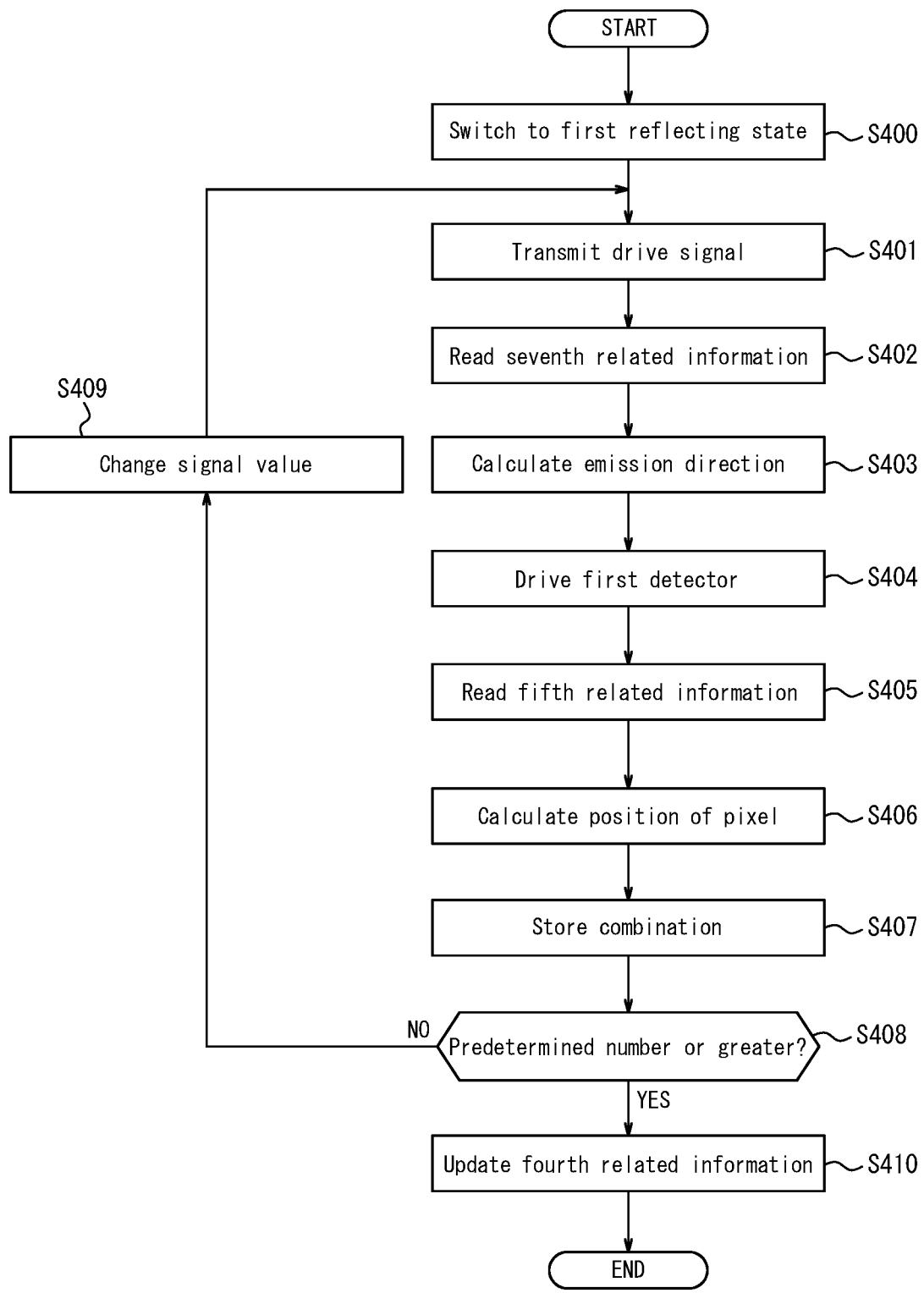
FIG. 18 is a flowchart illustrating processing, executed by the controller of FIG. 1, to update the fourth related information.

Next, the processing executed by the controller 14 in the present embodiment to update the fourth related information is described with reference to the flowchart of FIG. 18. The controller 14 starts the processing to update the fourth related information when, for example, an input device of the electromagnetic wave detection apparatus 10 detects an operation to execute the processing to update the fourth related information.

In steps S400 to S404, the controller 14 executes the same processing as in steps S100 to S104 of the processing to update the first related information. After the controller 14 distinguishes the position of the detection element in step S404, the process proceeds to step S405.

In step S405, the controller 14 reads the fifth related information from the memory 13. After the controller 14 reads the fifth related information, the process proceeds to step S406.

In step S406, the controller 14 uses the fifth related information read in step S405 to calculate the position of the pixel px corresponding to the emission direction calculated in step S403. After the controller 14 calculates the position of the pixel px, the process proceeds to step S407.

In step S407, the controller 14 stores a combination of the position of the pixel px calculated in step S406 and the position of the detection element distinguished in step S404 in the memory 13. After the controller 14 stores the combination, the process proceeds to step S408.

In steps S408 and S409, the controller 14 executes similar processing as in steps S106 and S107 of the processing to update the first related information. When the number of combinations is the predetermined number or greater in step S408, the process proceeds to step S410.

In step S410, the controller 14 uses the combinations stored in step S407 to update the fourth related information stored in the memory 13. After updating the fourth related information, the controller 14 ends the processing to update the fourth related information.

Figure 19:
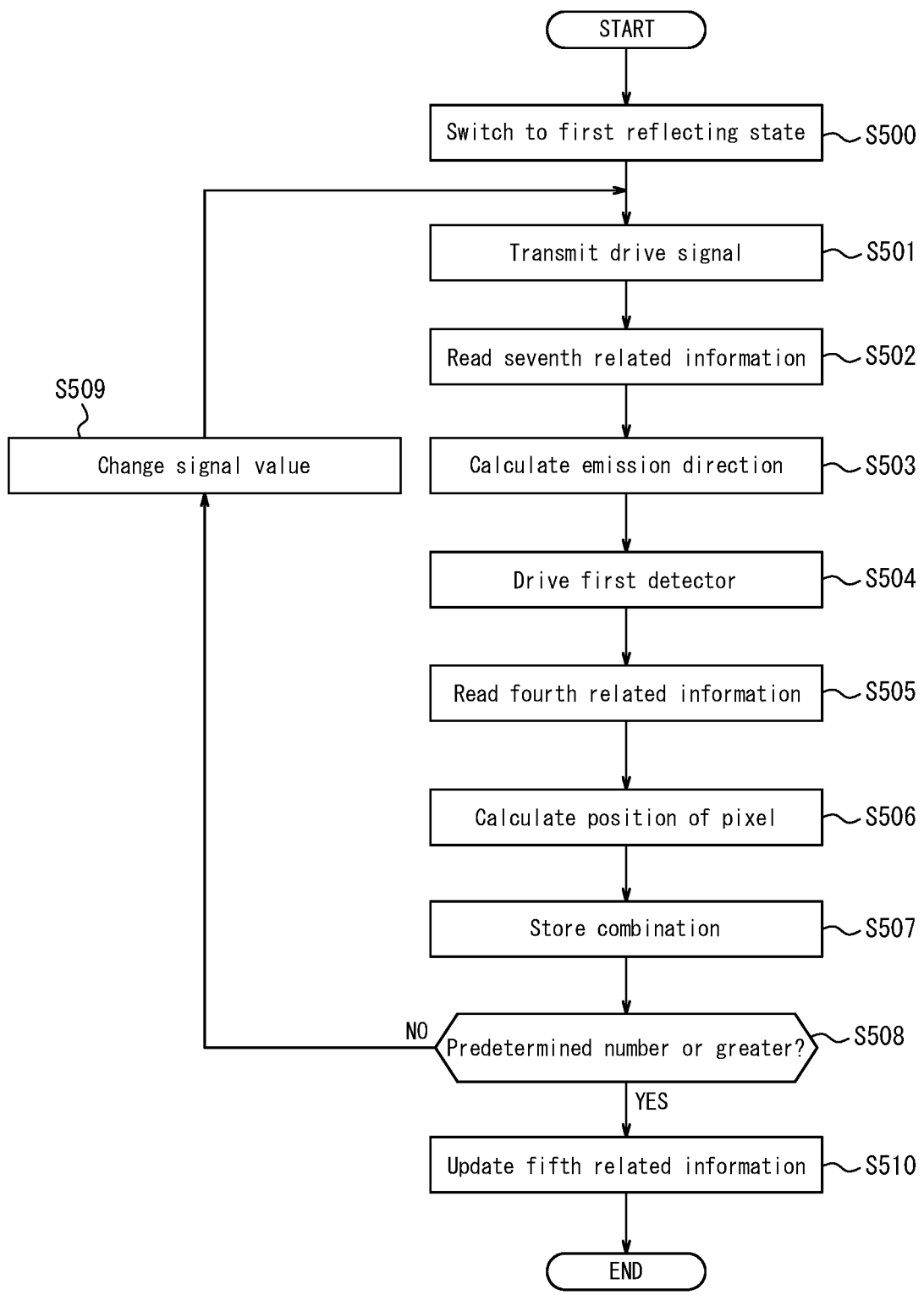
FIG. 19 is a flowchart illustrating processing, executed by the controller of FIG. 1, to update the fifth related information.

Next, the processing executed by the controller 14 in the present embodiment to update the fifth related information is described with reference to the flowchart of FIG. 19. The controller 14 starts the processing to update the fifth related information when, for example, an input device of the electromagnetic wave detection apparatus 10 detects an operation to execute the processing to update the fifth related information.

In steps S500 to S504, the controller 14 executes the same processing as in steps S100 to S104 of the processing to update the first related information. After the controller 14 distinguishes the position of the detection element in step S504, the process proceeds to step S505.

In step S505, the controller 14 reads the fourth related information from the memory 13. After the controller 14 reads the fourth related information, the process proceeds to step S506.

In step S506, the controller 14 uses the fourth related information read in step S505 to calculate the position of the pixel px corresponding to the position of the detection element distinguished in step S504. After the controller 14 calculates the position of the pixel px, the process proceeds to step S507.

In step S507, the controller 14 stores a combination of the emission direction calculated in step S503 and the position of the pixel px calculated in step S506 in the memory 13. After the controller 14 stores the combination, the process proceeds to step S508.

In steps S508 and S509, the controller 14 executes similar processing as in steps S106 and S107 of the processing to update the first related information. When the number of combinations is the predetermined number or greater in step S508, the process proceeds to step S510.

In step S510, the controller 14 uses the combinations stored in step S507 to update the fifth related information stored in the memory 13. After updating the fifth related information, the controller 14 ends the processing to update the fifth related information.

Figure 20:
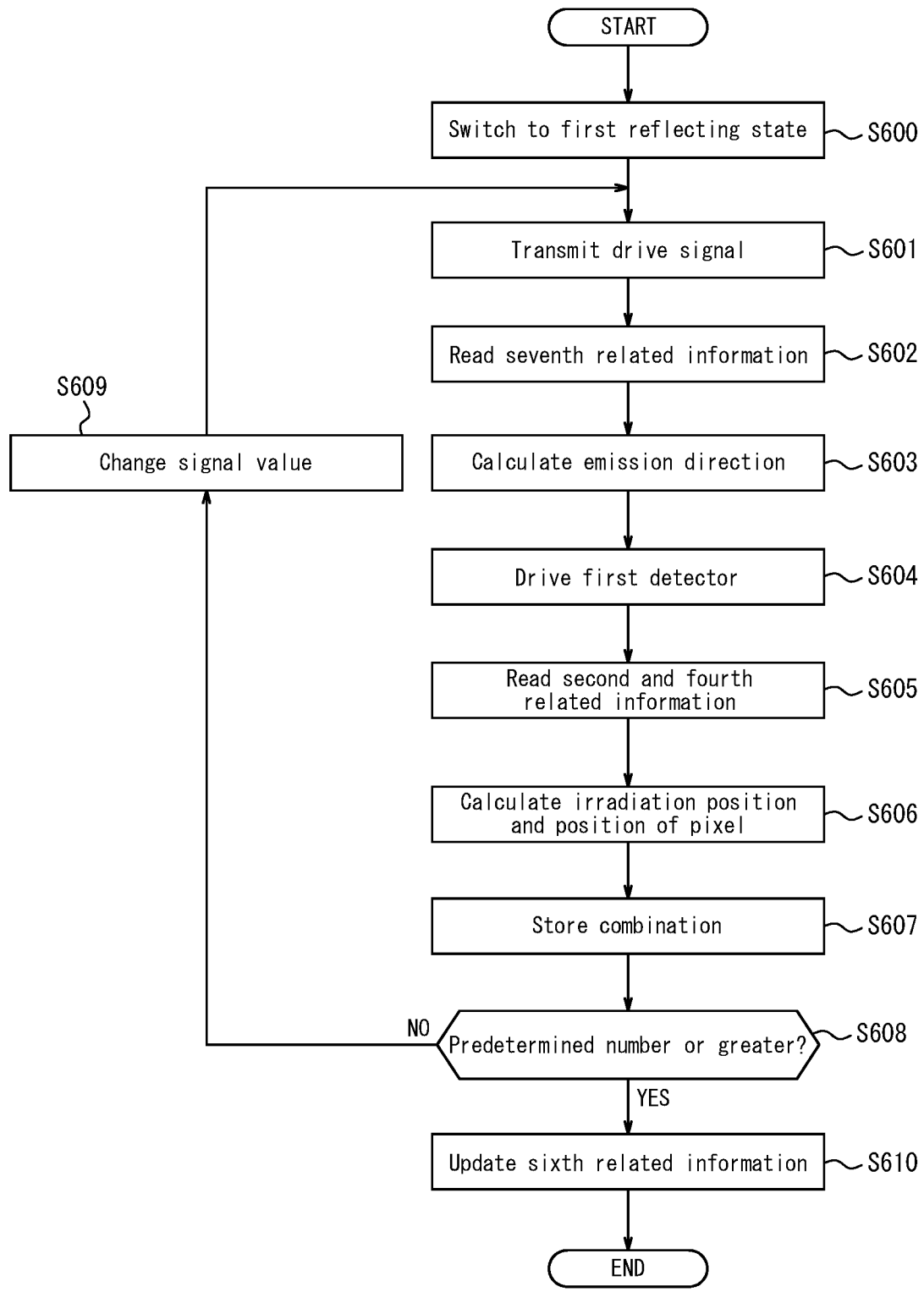
FIG. 20 is a flowchart illustrating processing, executed by the controller of FIG. 1, to update the sixth related information.

Next, the processing executed by the controller 14 in the present embodiment to update the sixth related information is described with reference to the flowchart of FIG. 20. The controller 14 starts the processing to update the sixth related information when, for example, an input device of the electromagnetic wave detection apparatus 10 detects an operation to execute the processing to update the sixth related information.

In steps S600 to S604, the controller 14 executes the same processing as in steps S100 to S104 of the processing to update the first related information. After the controller 14 distinguishes the position of the detection element in step S604, the process proceeds to step S605.

In step S605, the controller 14 reads the second related information and the fourth related information from the memory 13. After the controller 14 reads the second related information and the fourth related information, the process proceeds to step S606.

In step S606, the controller 14 uses the second related information read in step S605 to calculate the irradiation position corresponding to the emission direction calculated in step S603. The controller 14 also uses the fourth related information read in step S605 to calculate the position of the pixel px corresponding to the position of the detection element distinguished in step S604. After the controller 14 calculates the irradiation position and the position of the pixel px, the process proceeds to step S607.

In step S607, the controller 14 stores a combination of the irradiation position and the position of the pixel px calculated in step S606 in the memory 13. After the controller 14 stores the combination, the process proceeds to step S608.

In steps S608 and S609, the controller 14 executes similar processing as in steps S106 and S107 of the processing to update the first related information. When the number of combinations is the predetermined number or greater in step S608, the process proceeds to step S610.

In step S610, the controller 14 uses the combinations stored in step S607 to update the sixth related information stored in the memory 13. After updating the sixth related information, the controller 14 ends the processing to update the sixth related information.

The electromagnetic wave detection apparatus 10 of the present embodiment with the above configuration updates the related information based on the emission direction of electromagnetic waves and the position of the detection element that detects the reflected waves. With this configuration, the electromagnetic wave detection apparatus 10 can reduce the difference between i) the estimated correspondence relationship between any two of the emission direction and two elements defining two points on the path of the electromagnetic waves and reflected waves and ii) the actual correspondence relationship.

The electromagnetic wave detection apparatus 10 of the present embodiment can also switch each pixel px disposed on the action surface as of the propagation unit 20 between the first state and the second state. The electromagnetic wave detection apparatus 10 with this configuration can align the optical axis of the pre-stage optical system 19 with the optical axis of the first post-stage optical system 21 in the first direction d1, in which electromagnetic waves are propagated in the first state, and with the optical axis of the second post-stage optical system 22 in the second direction d2, in which electromagnetic waves are propagated in the second state. Accordingly, the electromagnetic wave detection apparatus 10 can reduce the misalignment between the optical axes of the first detector 17 and the second detector 18 by switching the pixels px of the propagation unit 20 between the first state and the second state. The electromagnetic wave detection apparatus 10 can thereby reduce the misalignment of detection axes in the first detector 17 and the second detector 18. Therefore, the electromagnetic wave detection apparatus 10 can reduce the misalignment of coordinate systems in the detection results of the first detector 17 and the second detector 18.

The electromagnetic wave detection apparatus 10 of the present embodiment can switch a portion of the pixels px in the propagation unit 20 to the first state and switch another portion of the pixels px to the second state. Accordingly, the electromagnetic wave detection apparatus 10 can cause the first detector 17 to detect electromagnetic waves at a portion of pixels px while simultaneously causing the second detector 18 to detect electromagnetic waves at another portion of pixels px. The electromagnetic wave detection apparatus 10 can thereby simultaneously acquire information relating to different regions.

The electromagnetic wave detection apparatus 10 of the present embodiment can switch the same pixel px in the propagation unit 20 to the first state and then to the second state. With this configuration, the first detector 17 can detect electromagnetic waves when the pixel px in the propagation unit 20 is in the first state, and immediately thereafter, the second detector 18 can detect electromagnetic waves when the pixel px is in the second state. The electromagnetic wave detection apparatus 10 can therefore reduce the misalignment in the timing of electromagnetic wave detection by the first detector 17 and the second detector 18 for the same pixel px in the propagation unit 20. The electromagnetic wave detection apparatus 10 can thereby reduce misalignment in the timing at which information relating to the same region is acquired.

The electromagnetic wave detection apparatus 10 of the present embodiment includes the irradiation source 15. Accordingly, by irradiating electromagnetic waves onto the object ob, the electromagnetic wave detection apparatus 10 can cause the second detector 18 to function as an active sensor. The electromagnetic wave detection apparatus 10 can also cause the first detector 17 to function as a passive sensor. With this configuration, the electromagnetic wave detection apparatus 10 can switch at least one of the pixels px in the propagation unit 20 from the first state to the second state to cause both an active sensor and a passive sensor to acquire information relating to the same region. Furthermore, with this configuration, the electromagnetic wave detection apparatus 10 can switch a portion of the pixels px in the propagation unit 20 to the first state and switch another portion of the pixels px to the second state to separate the region in which the active sensor acquires information from the region in which the passive sensor acquires information.

The electromagnetic wave detection apparatus 10 of the present embodiment includes the propagation direction modifier 16. With this configuration, the electromagnetic wave detection apparatus 10 can scan the object ob using electromagnetic waves emitted by the irradiation source 15. In other words, the electromagnetic wave detection apparatus 10 can cause the second detector 18 to cooperate with the propagation direction modifier 16 and function as a scanning-type active sensor. Accordingly, the electromagnetic wave detection apparatus 10 can use the second detector 18 to acquire information in accordance with positions in one or two dimensions.

Although the present disclosure has been explained using the accompanying drawings and examples, it is to be noted that various changes and modifications will be apparent to those of ordinary skill in the art based on the present disclosure. Therefore, such changes and modifications are to be understood as included within the scope of the present disclosure.

For example, in the present embodiment, the propagation unit 20 can switch the propagation direction of the electromagnetic waves incident on the action surface as between two directions, i.e. the first direction d1 and the second direction d2, but the propagation unit 20 may instead be capable of switching the propagation direction among three or more directions.

In the present embodiment, the first state of the propagation unit 20 is a first reflecting state for reflecting the electromagnetic waves incident on the action surface as in the first direction d1, and the second state of the propagation unit 20 is a second reflecting state for reflecting these electromagnetic waves in the second direction d2. This configuration is not, however, limiting.

For example, the second state may be a transmitting state for transmitting the electromagnetic waves incident on the action surface as for the electromagnetic waves to propagate in the second direction d2. In greater detail, the propagation unit 20 may include a shutter, on each pixel px, that has a reflecting surface that reflects electromagnetic waves. The propagation unit 20 with this configuration can open and close the shutter of each pixel px to switch each pixel px between the first reflecting state and the transmitting state that is the second state. An example of the propagation unit 20 with such a configuration is a propagation unit that includes a MEMS shutter including a plurality of openable shutters arranged in an array. Another example of the propagation unit 20 is a propagation unit that includes a liquid crystal shutter capable of switching, in accordance with liquid crystal orientation, between the reflecting state for reflecting electromagnetic waves and the transmitting state for transmitting electromagnetic waves. The propagation unit 20 with this configuration can switch each pixel px between the reflecting state as the first state and the transmitting state as the second state by switching the liquid crystal orientation of each pixel px.

In the electromagnetic wave detection apparatus 10 of the present embodiment, the first detector 17 is a passive sensor, and the second detector 18 functions as a portion of an active sensor. The electromagnetic wave detection apparatus 10 is not, however, limited to this configuration. For example, the electromagnetic wave detection apparatus 10 can achieve similar effects as in the present embodiment when the first detector 17 and the second detector 18 are both passive sensors and when both function as a portion of an active sensor.

In the present embodiment, the electromagnetic wave detection apparatus 10 is configured to include the irradiation source 15, the propagation direction modifier 16, the memory 13, the controller 14, and the electromagnetic wave detector 12, but the electromagnetic wave detection apparatus 10 may be configured to include at least one of these components. An electromagnetic wave detection system may be configured so that the electromagnetic wave detection apparatus 10 includes at least the electromagnetic wave detector 12, with another apparatus including the other components.

In the present embodiment, the electromagnetic wave detection apparatus 10 is configured so that the propagation direction modifier 16 scans the beam of electromagnetic waves emitted by the irradiation source 15, thereby causing the second detector 18 to cooperate with the propagation direction modifier 16 and function as a scanning-type active sensor. The electromagnetic wave detection apparatus 10 is not, however, limited to this configuration. For example, the electromagnetic wave detection apparatus 10 can achieve similar effects as in the present embodiment, without including the propagation direction modifier 16, by causing electromagnetic waves to be emitted radially from the irradiation source 15 and by acquiring information without scanning.

In the present embodiment, the electromagnetic wave detection apparatus 10 includes the propagation unit 20 and uses the first detector 17 to detect electromagnetic waves reflected by the propagation unit 20. The electromagnetic wave detection apparatus 10 is not, however, limited to this configuration. For example, the electromagnetic wave detection apparatus 10 can achieve similar effects as in the present embodiment, without including the propagation unit 20, by using the first detector 17 to detect incident electromagnetic waves that do not pass through the propagation unit 20.

In the present embodiment, the electromagnetic wave detection apparatus 10 can update the first related information through the sixth related information, but it suffices for the electromagnetic wave detection apparatus 10 to be capable of updating at least one of the first related information through the sixth related information.

While the disclosed system has a variety of modules and/or units for implementing particular functions, these modules and units have only been indicated schematically in order to briefly illustrate the functionality thereof. It should be noted that no particular hardware and/or software is necessarily indicated. In this sense, it suffices for the modules, units, and other constituent elements to be hardware and/or software implemented so as to substantially execute the particular functions described herein. The various functions of different constituent elements may be implemented by combining or separating hardware and/or software in any way, and the functions may each be used individually or in some combination. An input/output (I/O) device or user interface including, but not limited to, a keyboard, display, touchscreen, or pointing device may be connected to the system directly or via an I/O controller. In this way, the various subject matter disclosed herein may be embodied in a variety of forms, and all such embodiments are included in the scope of the subject matter in the present disclosure.

A machine-readable, non-transitory storage medium may also be configured by a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic and optical storage media (such as a compact disk (CD), laser disc® (laser disc is a registered trademark in Japan, other countries, or both), digital versatile disc (DVD), floppy disk, and Blu-ray Disc), portable computer disk, random access memory (RAM), read-only memory (ROM), rewritable programmable ROM such as EPROM, EEPROM, or flash memory, another tangible storage medium that can store information, or a combination of any of these. The memory may be provided internal and/or external to a processor or processing unit. As used in the present disclosure, the term "memory" refers to all types of long-term storage, short-term storage, volatile, non-volatile, or other memory. No limitation is placed on the particular type or number of memories, or on the type of medium for memory storage.

REFERENCE SIGNS LIST

10 Electromagnetic wave detection apparatus
11 Irradiator
12 Electromagnetic wave detector
13 Memory
14 Controller
15 Irradiation source
16 Propagation direction modifier
17 First detector
18 Second detector
19 Pre-stage optical system
20 Propagation unit
21 First post-stage optical system
22 Second post-stage optical system
as Action surface
d1 First direction d2 Second direction
ob Object
px, px1, px2 Pixel

The invention claimed is:

1. An electromagnetic wave detection apparatus comprising:
   an irradiator configured to emit electromagnetic waves;
   a first detector comprising a plurality of detection elements configured to detect, each of irradiation position, reflected waves of the electromagnetic waves irradiated onto an object;
   a memory configured to store related information including a plurality of kinds of the related information, each of the kinds of the related information associating any two elements of an element defining an emission direction of the electromagnetic waves and one or more elements defining plural points on a path of the electromagnetic waves emitted from the irradiator to the first detector via the object, each of the kinds of the related information including a plurality of combinations of the two elements, the plurality of combinations of the two elements in a kind of the related information being different from the plurality of combinations of the two elements in another of the kinds of the related information; and
   a controller configured to update the related information based on the emission direction of the electromagnetic waves and, a position of a detection element, among the plurality of detection elements, that detects the reflected waves of the electromagnetic waves, one of the kinds of the related information being updated using one or more other ones of the kinds of the related information having an element in common with the one of the kinds of the related information.

2. The electromagnetic wave detection apparatus of claim 1,
   wherein the related information comprises first related information associating the emission direction and the position of the detection element that detects the reflected waves of the electromagnetic waves emitted in the emission direction; and
   wherein the controller is configured to update the related information by updating the first related information.

3. The electromagnetic wave detection apparatus of claim 1,
   wherein the related information comprises second related information associating the emission direction and the irradiation position of the electromagnetic waves emitted in the emission direction; and
   wherein the controller is configured to update the related information by updating the second related information.

4. The electromagnetic wave detection apparatus of claim 1,
   wherein the related information comprises third related information associating the irradiation position and the position of the detection element that detects the reflected waves of the electromagnetic waves irradiated onto the irradiation position; and
   wherein the controller is configured to update the related information by updating the third related information.

5. The electromagnetic wave detection apparatus of claim 1, further comprising:
   a propagation unit comprising a plurality of propagation elements configured to propagate the reflected waves towards different detection elements according to irradiation position.

6. The electromagnetic wave detection apparatus of claim 5,
   wherein the related information comprises fourth related information associating a position of the propagation element and a position of the detection element towards which the propagation element propagates the reflected waves; and
   wherein the controller is configured to update the related information by updating the fourth related information.

7. The electromagnetic wave detection apparatus of claim 5,
   wherein the related information comprises fifth related information associating the emission direction and a position of the propagation element on which the reflected waves of the electromagnetic waves emitted in the emission direction are incident; and
   wherein the controller is configured to update the related information by updating the fifth related information.

8. The electromagnetic wave detection apparatus of claim 5,
   wherein the related information comprises sixth related information associating the irradiation position and a position of the propagation element on which the reflected waves of the electromagnetic waves irradiated onto the irradiation position are incident; and
   wherein the controller is configured to update the related information by updating the sixth related information.

9. The electromagnetic wave detection apparatus of claim 5, further comprising:
   a second detector disposed in a second direction different from a first direction in which the first detector is disposed relative to the propagation unit, the second detector configured to detect incident reflected waves of the electromagnetic waves;
   wherein the propagation unit is configured to switch each propagation element between a first state of propagating the reflected waves of the electromagnetic waves in the first direction and a second state of propagating the reflected waves of the electromagnetic waves in the second direction.

10. A non-transitory computer-readable recording medium that stores a control program for causing an apparatus to execute processes comprising:
    emitting electromagnetic waves;
    using a plurality of detection elements to detect, each of irradiation position, reflected waves of the electromagnetic waves irradiated onto an object; and
    updating related information, the related information including a plurality of kinds of the related information, each of the kinds of the related information associating any two elements of an element defining an emission direction of the electromagnetic waves and one or more elements defining plural points on a path of emitted electromagnetic waves to any detection element among the plurality of detection elements via the object, based on the emission direction of the electromagnetic waves and, a position of a detection element, among the plurality of detection elements, that detects the reflected waves of the electromagnetic waves, each of the kinds of the related information including a plurality of combinations of the two elements, the plurality of combinations of the two elements in a kind of the related information being different from the plurality of combinations of the two elements in another of the kinds of the related information, one of the kinds of the related information being updated using one or more other ones of the kinds of the related information having an element in common with the one of the kinds of the related information.

11. An electromagnetic wave detection system comprising:
an irradiator configured to emit electromagnetic waves;
a first detector comprising a plurality of detection elements configured to detect, each of irradiation position, reflected waves of the electromagnetic waves irradiated onto an object;
a memory configured to store related information including a plurality of kinds of the related information, each of the kinds of the related information associating any two elements of an element defining an emission direction of the electromagnetic waves and one or more elements defining plural points on a path of the electromagnetic waves emitted from the irradiator to the first detector via the object, each of the kinds of the related information including a plurality of combinations of the two elements, the plurality of combinations of the two elements in a kind of the related information being different from the plurality of combinations of the two elements in another of the kinds of the related information; and
a controller configured to update the related information based on the emission direction of the electromagnetic waves and, a position of a detection element, among the plurality of detection elements, that detects the reflected waves of the electromagnetic waves, one of the kinds of the related information being updated using one or more other ones of the kinds of the related information having an element in common with the one of the kinds of the related information.

* * * * *